(12) United States Patent
Miyajima et al.

(10) Patent No.: US 6,311,894 B1
(45) Date of Patent: *Nov. 6, 2001

(54) OPTICAL SCANNING DEVICE HAVING A REFLECTION SECTION AND PHOTODETECTING SECTION INTEGRALLY FORMED ON A MOVING PART OF AN OPTICAL SCANNING SECTION

(75) Inventors: Hiroshi Miyajima; Mitsunori Kubo, both of Hachioji (JP)

(73) Assignee: Olympus Optical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/282,377

(22) Filed: Mar. 31, 1999

(30) Foreign Application Priority Data

Apr. 3, 1998 (JP) .................................................. 10-09111

(51) Int. Cl.[7] ....................................................... G02B 5/08

(52) U.S. Cl. ................................. 235/462.36; 235/462.45; 235/472.01

(58) Field of Search ......................... 235/462.36, 462.38, 235/462.43, 462.45, 472.01

(56) References Cited

U.S. PATENT DOCUMENTS

| | | | | |
|---|---|---|---|---|
| 5,241,174 | * | 8/1993 | Ando ..................................... | 250/235 |
| 5,302,812 | * | 4/1994 | Li et al. ............................ | 235/462.01 |
| 5,589,680 | * | 12/1996 | Swartz et al. ..................... | 235/472.01 |
| 5,693,929 | * | 12/1997 | Dvorkis et al. ....................... | 235/454 |
| 6,052,191 | * | 4/2000 | Brayden, Jr. et al. ................ | 356/381 |
| 6,188,504 | * | 2/2001 | Marakami et al. ................... | 359/224 |

FOREIGN PATENT DOCUMENTS 2-178888   7/1990   (JP) .
10-20226   1/1998   (JP) .

OTHER PUBLICATIONS

L.Y. Lin, et al., "Microactuated Micro–XYZ Stages For Free–Space Micro–Optical Bench", Proceedings of MEMS–97, *IEEE* (0–7803–3744–1/97), 1997, pp. 43–48.

Jun–ichi Shimada, et al., "Gradient–index microlens formed by ion–beam sputtering", *Applied Optics*, vol. 31, No. 25, Sep. 1, 1992, pp. 5230–5236.

S. Linder, et al., "Photolithography in Anisotropically Etched Grooves", Proceedings of MEMS–96, *IEEE* (0–7803–2985–Jun. 1996), pp. 38–43.

* cited by examiner

Primary Examiner—Karl D. Frech
Assistant Examiner—Daniel St. Cyr
(74) Attorney, Agent, or Firm—Frishauf, Holtz Goodman, Langer & Chick, P.C.

(57) ABSTRACT

An optical scanning device has a light source. A condenser lens gathers rays of emitted light from the light source. A reflecting section reflects the light gathered by the condenser lens. An optical scanning section includes of a fixed section and a moving section and causes the light reflected by the reflecting section to scan an object to be scanned. A photodetecting section receives and detects the light returned from the object scanned by the optical scanning section. The reflecting section and the photodetecting section are integrally formed on the moving section of the optical scanning section.

18 Claims, 14 Drawing Sheets

CROSS SECTION VI - VI'

CROSS SECTION VII - VII'

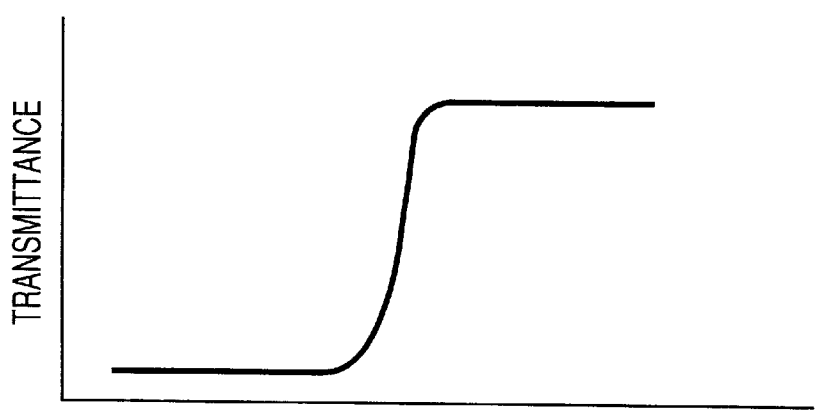
FIG. 4A
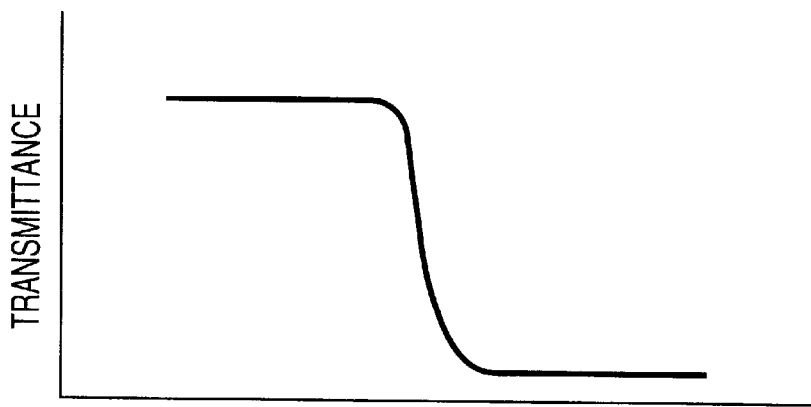
FIG. 4B
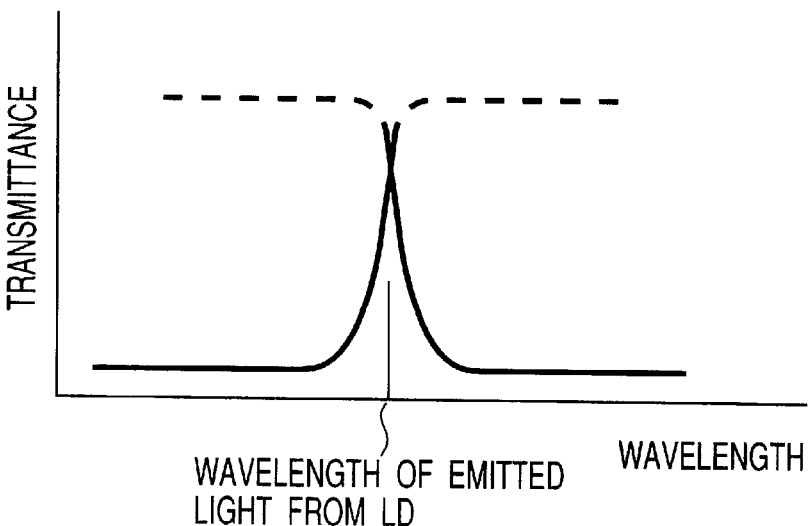
FIG. 4C  WAVELENGTH OF EMITTED LIGHT FROM LD

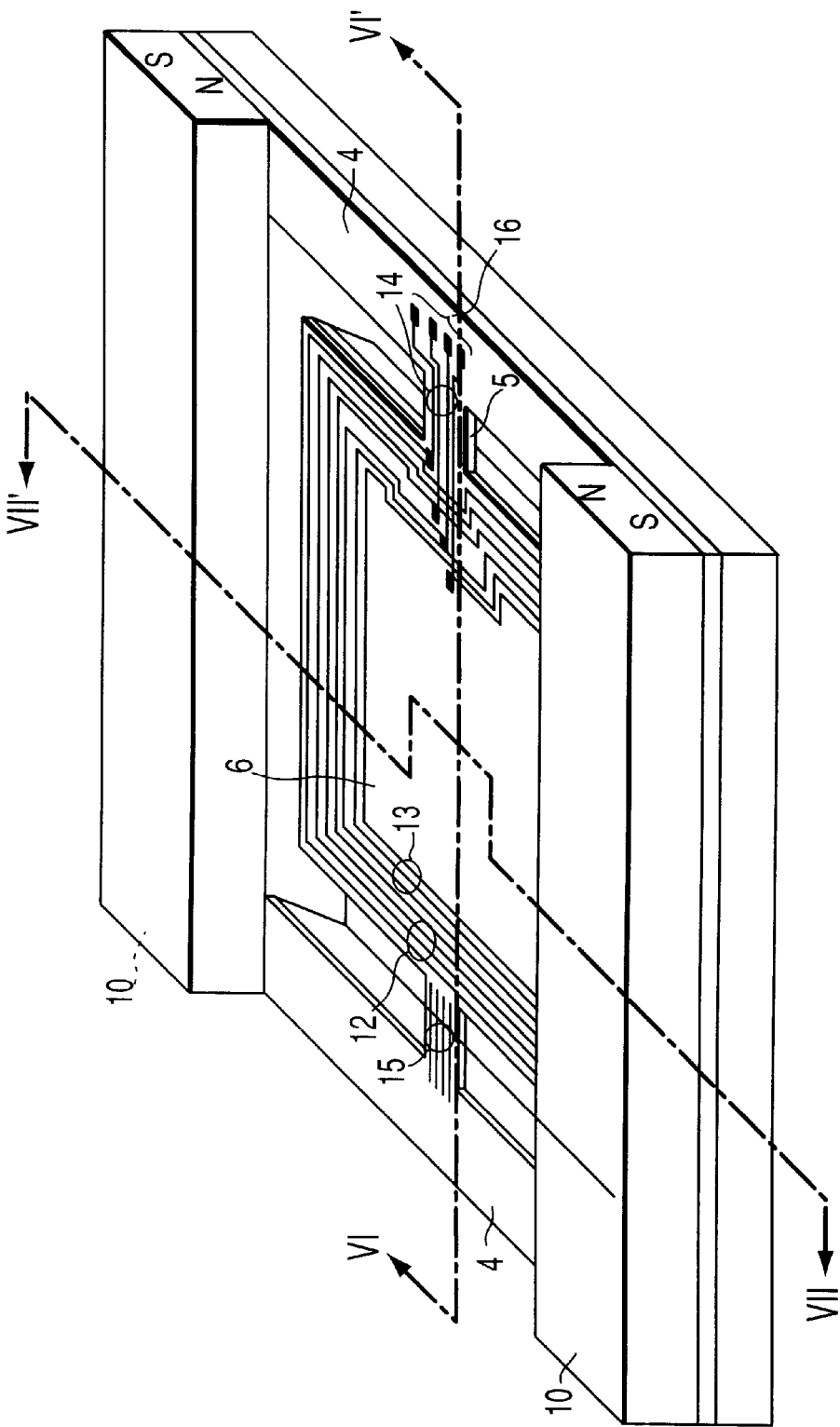
F I G. 5

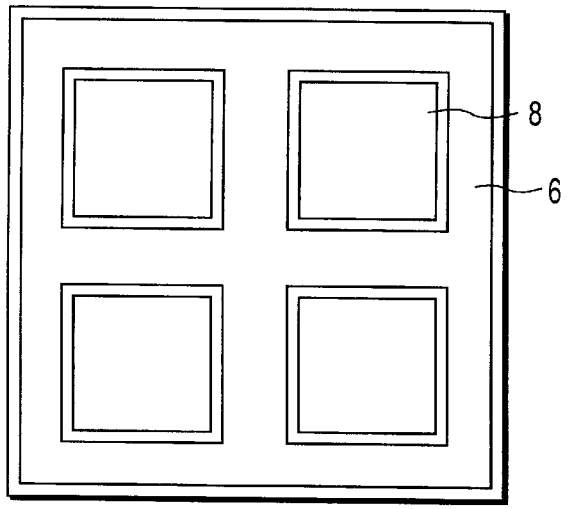
F I G. 16
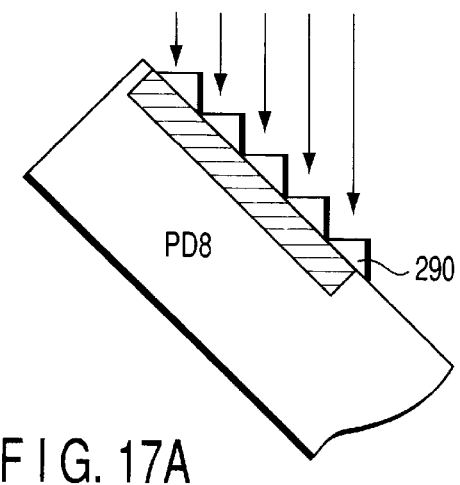
F I G. 17A
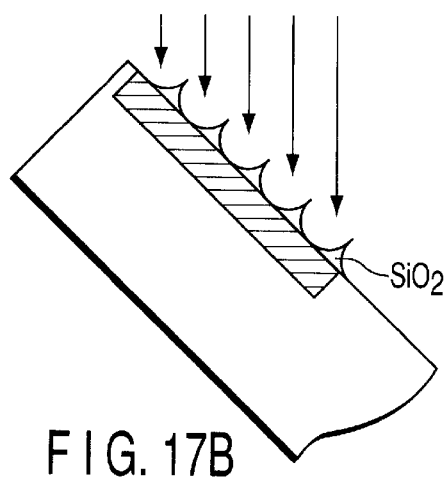
F I G. 17B
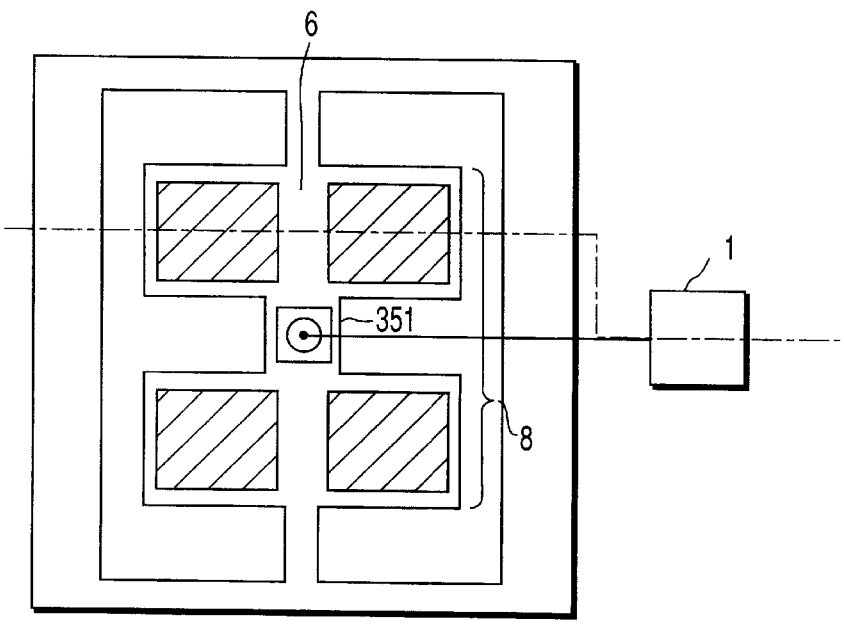
F I G. 18

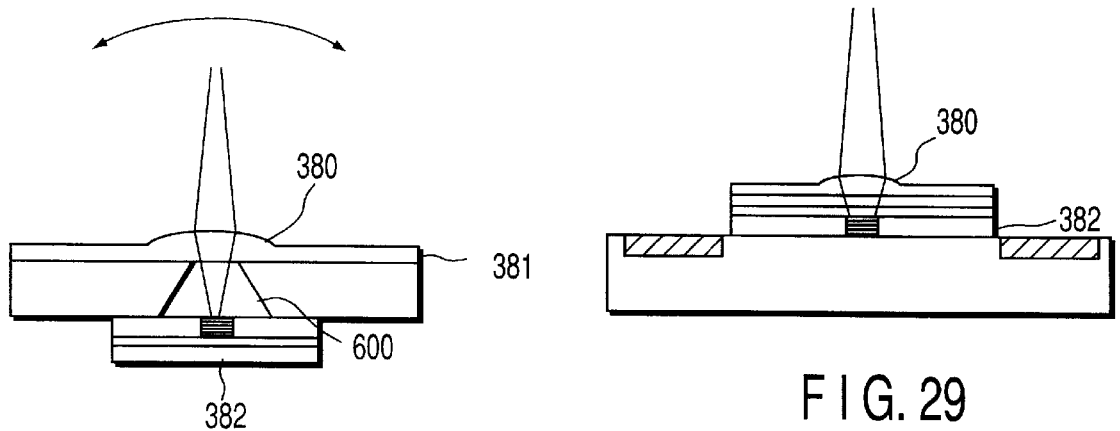
FIG. 28
FIG. 29
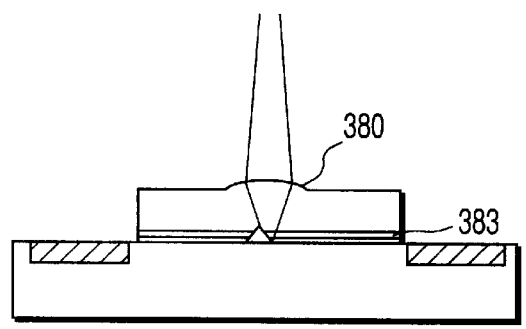
FIG. 30
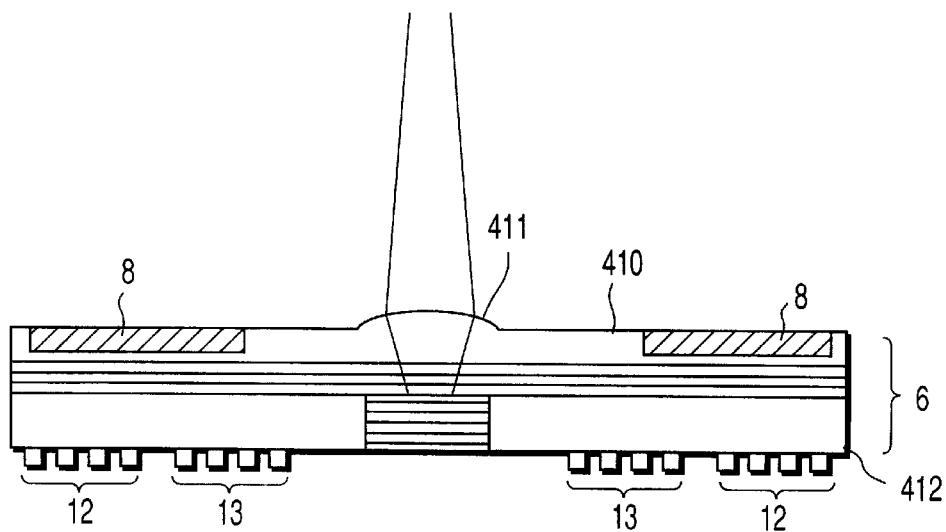
FIG. 31

OPTICAL SCANNING DEVICE HAVING A REFLECTION SECTION AND PHOTODETECTING SECTION INTEGRALLY FORMED ON A MOVING PART OF AN OPTICAL SCANNING SECTION

BACKGROUND OF THE INVENTION

The present invention relates to an optical scanning device, such as a bar code scanner.

A bar code scanner is a device for reading the bar code on the surface of a commodity as an identification symbol to identify it, by optically scanning the bar code.

In connection with such a bar code scanner, Jpn. Pat. Appln. KOKAI Publication 2-178888 has disclosed a lightweight, portable bar code scanner. FIG. 32 is a front view of a laser scanning head 110 used in the bar code scanner. FIG. 33 is a vertical sectional view taken along line I–I' of FIG. 32. FIG. 34 is a transverse sectional view taken along line XXXIV–XXXIV' of FIG. 33. Numeral 111 indicates the body section. In the figures, the emitted light from a laser diode (hereinafter, referred to as LD) 133 passes through a focusing lens 132 and strikes a scanning mirror 119b. As the scanning mirror 119b is rotated by a scanning motor 124, this causes the reflected light to scan. The reflected light passes through a window 114, hits the bar code (not shown) located outside the head, and scans it. The reflected light from the bar code passes through the window 114, taking the reverse route of the emitted light, and strikes a condenser mirror 119a, which gathers the rays of light on a photosensor 117, which then senses the light.

The conventional optical system is characterized by selectively sensing the reflected light and scattered light from the vicinity of the area on which the emitted light is actually projected by causing the scanning mirror 119b to force the emitted light to scan at the same time that the condenser mirror 119a scans the visual field of the photosensor 117. This configuration minimizes the effect of external light. The scanning mirror 119b and condenser mirror 119a are integrally formed and caused to scan by the scanning motor 124. (Hereinafter, they are referred to as an integral scanning and receiving mirror 119).

In the prior-art optical system, the LD 133, focusing lens 132, integral scanning and receiving mirror 119, and photosensor 117 are used as bar code scanner component parts. They have to be positioned and assembled, which makes it difficult to reduce costs. Because the incident angle of light to the integral scanning and receiving mirror 119 is small (close to vertical incidence), the LD 133 and photosensor 117 have to be separated a suitable distance away from the integral scanning and receiving mirror 119 so that they may not block the reflected light. This makes it difficult to make the scanner more compact.

Furthermore, the focusing lens 132 for determining the position of the focal point of the emitted light is designed to have the ability to read the bar code relatively away from (several tens of centimeters from) the bar code scanner. In addition, the gathering mirror 119a is designed to have a much larger area than that of the scanning mirror 119b according to the distance to the bar code. With such a configuration, the large moving part requires the scanning motor 124 to produce a greater driving force, which makes it difficult to make the bar code scanner more compact. Moreover, an attempt to combine the scanning mirror 119b composed of a plane mirror and the condenser mirror 119a of a concave mirror into an integral structure raises the problem of complicating the mirror manufacturing method.

BRIEF SUMMARY OF THE INVENTION

The object of the present invention is to provide an optical scanning device capable of reducing the number of component parts constituting the optical scanning device while making use of the advantages of the prior art, and thereby not only making the scanning device more compact but also reducing costs.

The foregoing object is accomplished by providing an optical scanning device according to a first aspect of the present invention, comprising: a light source; a condenser lens gathers rays of emitted light from the light source; a reflecting section that reflects the light gathered by the condenser lens; an optical scanning section which includes a fixed section and a moving section and which causes the light reflected by the reflecting section to scan an object to be scanned; and a photodetecting section that receives and detects light returned from the object scanned by the optical scanning section, wherein the reflecting section and the photodetecting section are integrally formed on the moving section of the optical scanning section.

According to a second aspect of the present invention, there is provided an optical scanning device comprising: a light source; a condenser lens that gathers rays of light from the light source; an optical scanning section which includes a fixed section and a moving section and which causes the light gathered by the condenser lens to scan an object to be scanned; and a photodetecting section that receives and detects light returned from the object scanned by the optical scanning section, wherein the light source and photodetecting section are integrally formed on the moving section of the optical scanning section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A to 4C are characteristic diagrams of various types of filters in FIG. 2, FIG. 4A showing a characteristic of a short wavelength cut filter, FIG. 4B a characteristic of a long wavelength cut filter, and FIG. 4C a characteristic of a band-pass filter;

FIG. 5 shows a detailed configuration of the scanning mirror unit 2 of FIG. 1;

FIG. 16 shows the shape of the finished moving section in the modification of FIG. 15;

FIGS. 17A and 17B show modifications obtained by serrating the PD surface;

FIG. 18 is a plan view of a bar code scanner according to a second embodiment of the present invention, viewed from the axis of the emitted light;

FIG. 28 is a sectional view of the bar code scanner of FIG. 27 taken along a plane including the axis of the emitted light;

FIG. 29 is a sectional view of a modification of the fourth embodiment where a condenser lens is integrally formed at the surface of the VCSEL substrate;

FIG. 30 is a sectional view of a modification of the fourth embodiment where a condenser lens is integrally formed at the substrate by using a horizontal-cavity SEL;

FIG. 31 is a sectional view of a modification of the fourth embodiment where the sensing PD, light source, and condenser lens are all integrated monolithically;

DETAILED DESCRIPTION OF THE INVENTION

Hereinafter, referring to the accompanying drawings, embodiments of the present invention will be explained in detail. First, a first embodiment of the present invention will be explained by reference to FIGS. 1 to 12.

Figure 1:
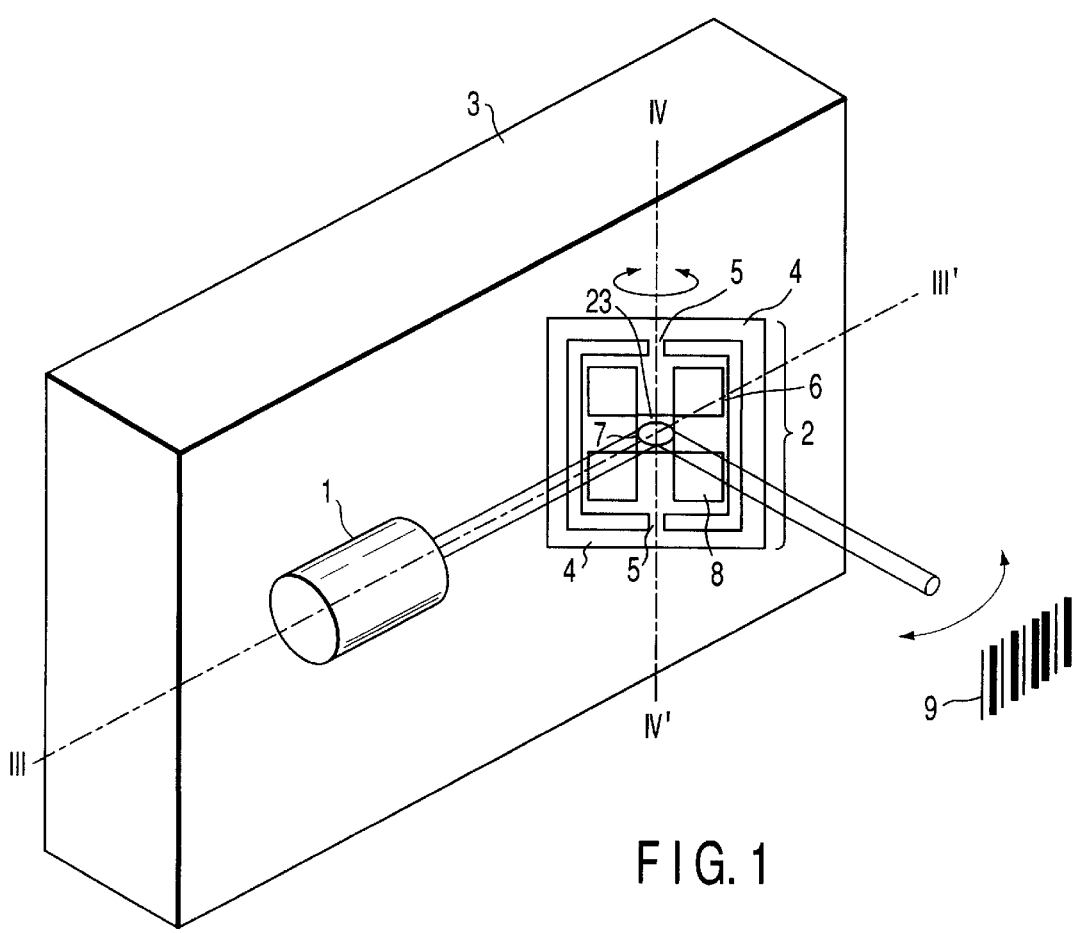
FIG. 1 shows a schematic overall configuration of a bar code scanner according to a first embodiment of the present invention.

FIG. 1 shows a schematic overall configuration of a bar code scanner according to the first embodiment where an optical scanning device of the present invention has been applied. In the first embodiment, a light source module 1 and a scanning mirror unit 2 acting as an optical scanning section are incorporated in a scan engine housing (hereinafter, referred to as a housing) 3. The light source module 1 includes an LD and a condenser lens, such as a ball lens, (none of them shown).

The scanning mirror unit 2 comprises a frame 4 serving as a fixed section, two torsion-bar elastic members 5, and a moving member 6 acting as a moving section. At the surface of the moving member 6, a reflecting mirror 7 acting as a reflecting section, and 4-quadrant photodiode (hereinafter, referred to as PD) 8 acting as a photodetecting section are integrally formed. The act of forming the parts integrally means not only integrating the parts into a monolithic structure by processing, for example, a silicon substrate by semiconductor processes but also bonding the two parts separately manufactured into a single entity. The PD 8 is split into four quadrants. This is done by masking the regions where the PD8 is not to be formed and then forming a PD. The reflecting mirror 7 is formed by forming a high-reflectivity film 23, such as aluminum, at the surface near the central portion of the moving member, instead of forming the PD 8. Numeral 9 indicates a bar code as an identification symbol given to the surface of a commodity.

Figure 2:
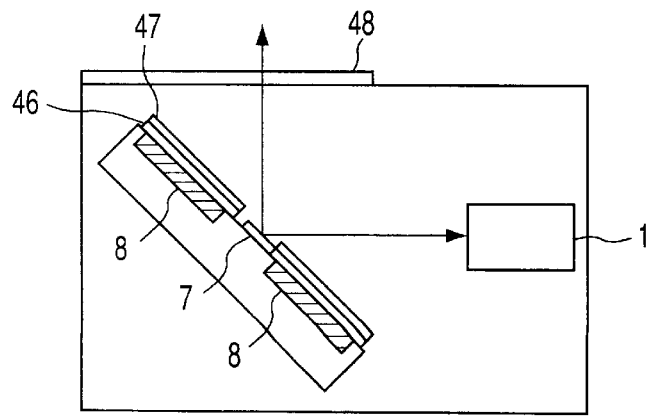
FIG. 2 is a sectional view taken along a plane passing through line III–III' and perpendicular to the axis of rotation IV–IV' of a scanning mirror unit 2 in the bar code scanner of FIG. 1.

FIG. 2 is a sectional view taken along a plane passing through line III–III' and perpendicular to the axis of rotation IV–IV' of the scanning mirror unit 2 in the bar code scanner of FIG. 1. A long wavelength cut filter 46 is provided on the surface of the PD 8. An anti-reflection coating 47 (i.e., a coating in order to reduce reflection at the surface where -the coating is provided: hereinafter, referred to as an AR coating) acting as a reflectivity reducing section is applied to the surface of the filter 46. The coating 47 is designed to have the lowest reflectivity when the reflected light and scattered light from the bar code (not shown) enter the coating at an incident angle of about 45 degrees. At the scanner window section, a short wavelength cut filter 48 is formed. The short wavelength cut filter 48 and long wavelength cut filter 46 constitute a wavelength selecting section in such a manner that their multiplier effect allows only rays of light near the wavelength of the LD (normally in the vicinity of 650 nm) to reach the PD 8. The wavelength selecting section prevents the bar code 9 from being read erroneously because of the effect of external light. Moreover, it does not require an expensive band-pass filter (hereinafter, referred to as a BPF) used in a conventional bar code scanner.

Figure 3:
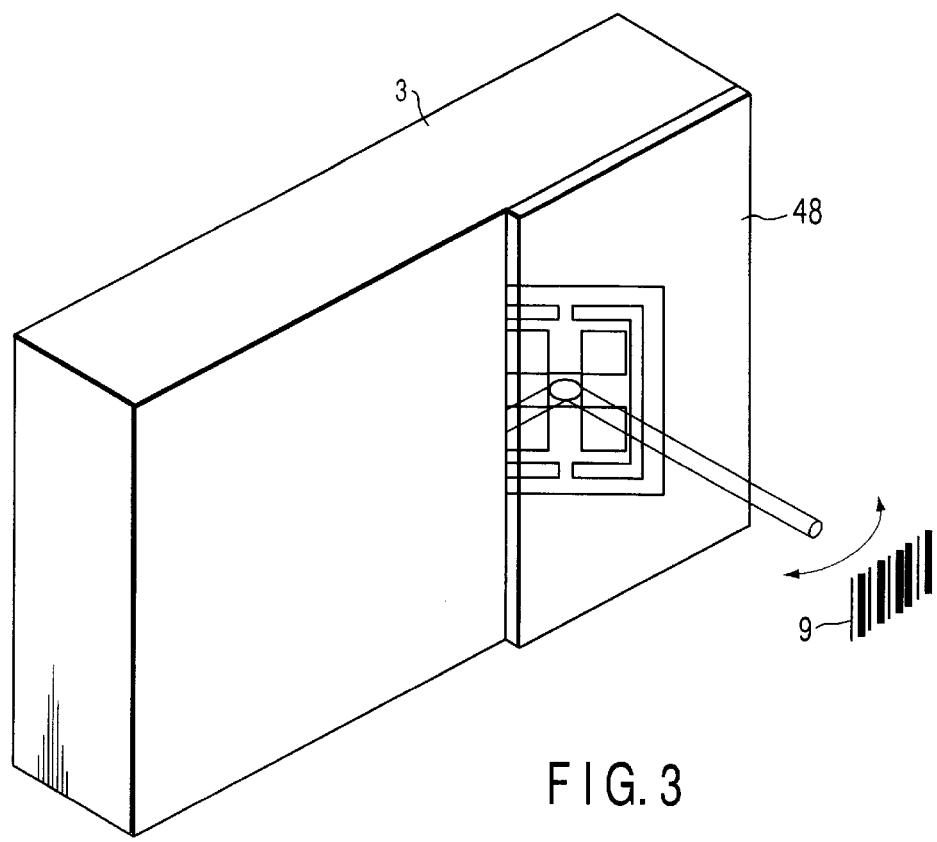
FIG. 3 is an external view of the housing 3 shown in FIG. 1.

FIG. 3 is an external view of the housing 3. FIGS. 4A to 4C are characteristic diagrams of the various types of filters described above. FIG. 4A shows a characteristic of a short wavelength cut filter. FIG. 4B shows a characteristic of a long wavelength cut filter. FIG. 4C shows a characteristic of a BPF obtained by combining the short wavelength cut filter of FIG. 4A and the long wavelength cut filter of FIG. 4B.

FIG. 5 shows a detailed configuration of the scanning mirror unit 2. In FIG. 5, the configuration of the top surface side of the moving member 6 is shown, provided that the surface of the moving member at which the reflecting mirror 7 and PD 8 have been formed is the bottom surface. The reflecting mirror 7 and PD 8 are not shown. In the figure, at the surface of the moving member 6, a driving coil 12 and a speed sensing coil 13 acting as electrical elements are formed.

On the other hand, two permanent magnets 10 are provided near the vibrating ends of the moving member 6, one at each end, and are fixed to a frame 4. In this state, the vibrating ends of the moving member 6 are allowed to come close to the permanent magnets 10. Leads 14 connected to the driving coil 12 and speed sensing coil 13 on the moving member 6 pass inside or over the elastic member 5 and are connected to an electrode pad 16 provided on the frame 4. On the surface or inside the elastic member 5 on the opposite side, dummy leads 15 which have the same shape as that of the leads 14 but are connected to neither the driving coil 12 nor speed sensing coil 13 are provided in such a manner that the mechanical characteristics of the elastic member 5 on both sides are equal.

Figure 6:
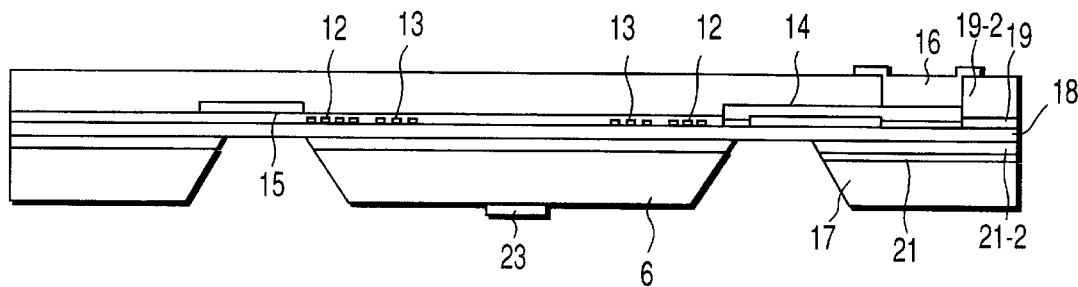
FIG. 6 is a sectional view of the scanning mirror unit 2 including an elastic member 5 as taken along line VI–VI' of FIG. 5.
Figure 7:
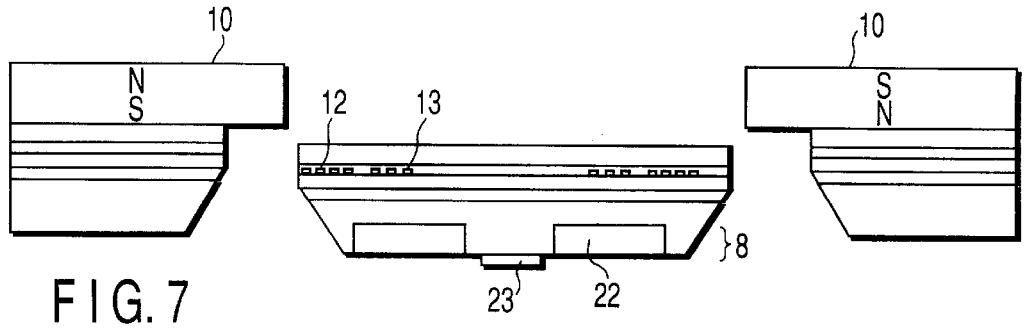
FIG. 7 is a sectional view of the scanning mirror unit 2 as taken along line VII–VII' of FIG. 5.

FIG. 6 is a sectional view of the scanning mirror unit 2 including the elastic member 5 as taken along line VI–VI' of FIG. 5. FIG. 7 is a sectional view of the scanning mirror unit 2 as taken along line VII–VII' of FIG. 5. FIG. 6 shows a structure of the driving coil 12, speed sensing coil 13, leads 14, and electrode pad 16 in the direction of substrate thickness. In the embodiment, a p-type monocrystalline silicon substrate 17 has a <100> plane as a surface at which the frame 4 and moving member 6 are formed. At the surface of the p-type monocrystalline silicon substrate 17, for example, a high-concentration phosphorous diffused layer 21 is formed to produce a conducting layer. Thereafter, silicon nitride or the like is used to form an etching stop layer 21-2 in the silicon substrate 17. Then, a first insulating film 18 is formed. On the insulating film 18, a driving coil 12, a speed sensing coil 13, a second insulating film 19, leads 14, a third insulating film 19-2, and an electrode pad 16 are formed in that order. The shapes of the frame 4 and moving member 6 are obtained by etching the silicon substrate 17 from below the bottom surface. The shape of the elastic member 5 is obtained by etching the multilayer film formed on the substrate.

FIG. 7 is a sectional view of the PD 8 formed at the opposite surface of the p-type substrate to the surface at which the driving coil 12 and speed sensing coil 13 have been formed. The PD 8 is formed by doping, for example, phosphorus into the surface of the p-type substrate, dividing the diffused layer 22, and then forming a p-n junction at the interface between the divided layers and the substrate. Because each piece of the PD 8 thus formed has the reduced electrical capacitance, the response characteristic is improved.

Next, the operation of the first embodiment will be explained by reference to FIG. 1. When current is supplied to the LD (not shown) built in the light source module 1, the LD then emits light. Usually, the light from the LD spreads elliptically. As the light passes through a small lens (not shown) in the light source module 1, it converges at a specific point. The emitted light from the light source module 1 become a luminous flux with a diameter of about 1 to 1.5 mm. The flux strikes the reflecting mirror 7 provided in the center of the moving member 6 and is then reflected there toward the bar code 9.

Part of the light reflected or scattered by the bar code 9 advances toward the scanning mirror unit 2, hits the PD 8 formed at the surface of the moving member 6, and is sensed there. The light reflected regularly by the bar code 9 returns to almost the center of the moving member 6. Because the PD 8 has not been formed in and around the center, the light is reflected toward the LD without being sensed by the PD 8.

When current is supplied to the driving coil 12 of FIG. 5, the interaction of the generated magnetic field with the permanent magnets 10 produces Lorentz force. By virtue of the Lorentz force, the reflecting mirror 7 causes the light to scan. As the moving member 6 moves, the speed sensing coil 13 moves in the magnetic field, which produces an induced electromotive force proportional to the speed. Monitoring the output of the speed sensing coil 13 makes it possible to know the state of motion of the reflecting mirror 7 formed integrally with the moving member 6.

In the scanning mirror unit 2 used in the embodiment, the parts excluding the permanent magnets 10 and yoke can be formed by semiconductor processes. Since a method of forming them has been disclosed in detail in, for example, Jpn. Pat. Appln. KOKAI Publication 10-20226, a detailed explanation of the method will not be given here. One of the advantages of the present invention is that the PD 8 is formed integrally with the moving member 6. Hereinafter, a method of forming the integral structure will be described by reference to FIGS. 8A, 8B, 8C and 9.

Figure 8A:
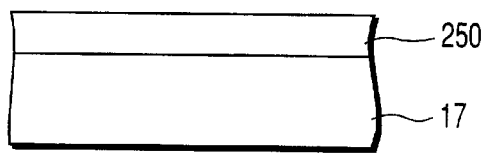
FIGS. 8A to 8C are diagrams to help explain the processes f manufacturing PD 8.
Figure 8B:
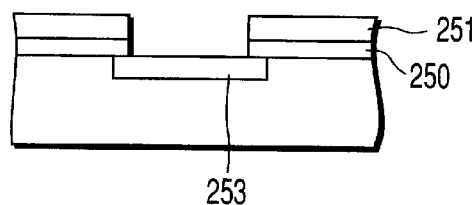
Figure 8C:
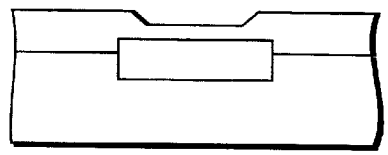

FIGS. 8A, 8B, and 8C are diagrams to help explain the manufacturing processes. First, a thermal oxidation film ($SiO_2$) 250 is formed at the surface of the <100> p-type monocrystalline silicon substrate 17 at which no driving coil has been formed (FIG. 8A). Then, the shape of an ion implantation section is patterned using a photoresist 251 by photolithography. With the resulting mask, the oxide film is patterned to make holes, followed by an ion implantation process (in this case, an ion implantation of n-type impurities, such as phosphorus ions). As a result, an $n^+$ layer 253 is formed (FIG. 8B). Finally, annealing is done at high temperatures for oxidization, thereby effecting diffusion down to a specific depth of the $n^+$ layer 253 and producing a protective film on the surface, which completes the process (FIG. 8C).

Figure 9:
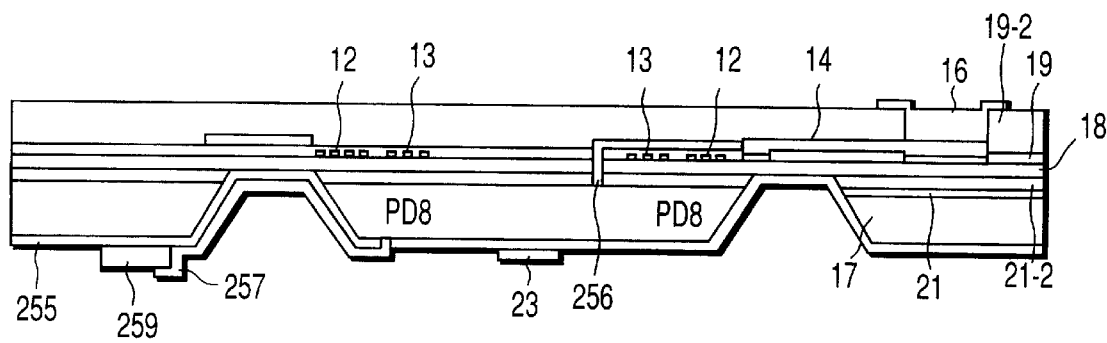
FIG. 9 is a diagram to help explain a method of wiring PD 8.

FIG. 9 is a diagram to help explain a method of wiring the PD 8. In the embodiment, the PD 8 is split into four quadrants and therefore four leads from the $n^+$ layer 253 are needed. On the other hand, only one lead 256 from a p-type layer is drawn from the p-type monocrystalline silicon substrate 17, because all the PD 8 use the p-type monocrystalline silicon substrate 17 as it is. The resulting state is shown in FIG. 9.

First, the <100> p-type monocrystalline silicon substrate 17 on which the PD 8 have been formed is etched to pattern the moving member and frame. Thereafter, an insulating film 255, such as a plasma oxide film, is formed on the moving member on which leads are formed, the side face of the frame and the bottom surface of the elastic member. Then, a lead 257 and an electrode pad 259 are formed and patterning is done.

Figure 10:
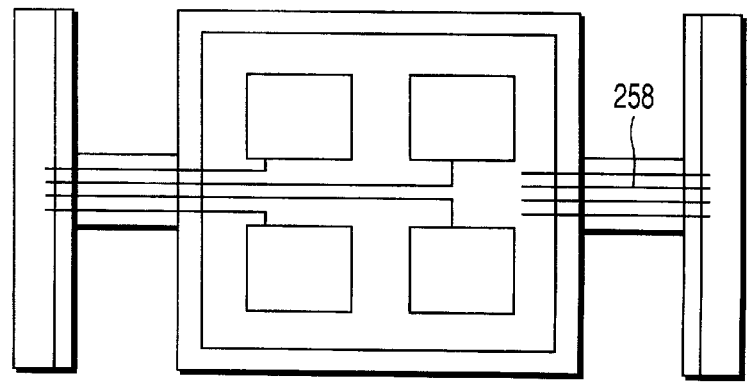
FIG. 10 is a diagram to help explain a method of forming a wiring pattern.

The wiring pattern is formed in such a manner that, for example, all the leads pass through the elastic member on the same side as shown in FIG. 10. On the other hand, dummy leads 258 are formed on the elastic member on the opposite side to equalize the mechanical characteristics of the elastic members on both sides. The patterning of wiring material is not easy because it is done on an inclined surface. In this connection, one known method is to form a resist film by plating, effect patterning to form a mold, and then plate with a metal, such as nickel. Another known method is to draw a metal pattern directly by a method called a Jet Printing System (JPS). The former has been disclosed in, for example, S. Linder, et al., "Photography in anisotropically etched grooves," Proceedings of MEMS-96.

On the other hand, the lead 256 from the substrate (p-type layer) can be connected to an external circuit as the coil leads are, on the side where the driving coil 12 has been formed.

Like the prior art, the first embodiment is less liable to be affected by external light because it causes the emitted light to scan and scans the visual field of the PD 8. In addition, integrating the scanning mirror unit 2 and the PD 8, which are separate in the prior art, into a single entity, the first embodiment produces the effect of reducing the number of component parts and making the bar code scanner more compact. Moreover, an expensive BPF, used in the prior art, is not necessary. By replacing it with a combination of a BPF formed integrally with the PD surface and an inexpensive filter provided on the scanner window, further cost reduction is achieved.

Because the PD 8 formed integrally with the moving member 6 causes the driving coil 12, part of the actuator, to be located near the PD 8, the noise of the driving signal flowing through the driving coil 12 might have an effect on the PD 8. In the embodiment, the diffused layer (conducting layer) 21 is formed as an electrical shield section before the formation of the driving coil 12, which reduces noise. The division of the PD 8 not only improves the response characteristic but also increases the correctness of reading by a sophisticated process, such as ignoring an abnormal output, even when only one particular PD 8 produces an output very different from the other outputs due to disturbance.

The configuration of the embodiment may be modified in still other ways. For instance, while the electromagnetic actuator composed of the permanent magnets 10 and driving coil 12 has been used in the scanning mirror unit 2, electromagnets may be used in place of the permanent magnets. The moving section may be provided with a magnet. The magnet may be formed monolithically. Furthermore, an actuator based on another principle may be used.

Figure 11:
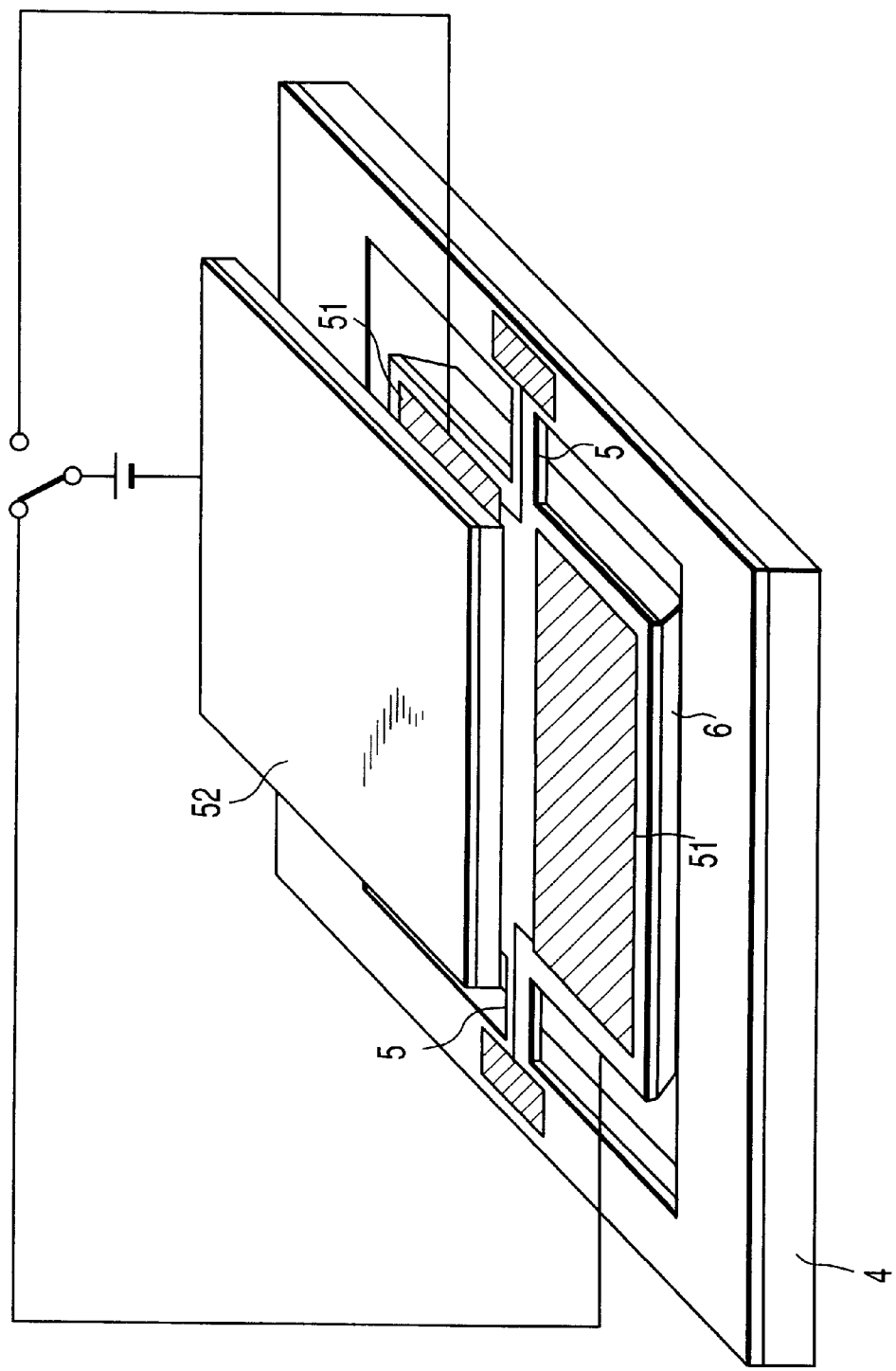
FIG. 11 is a diagram to help explain a modification of the first embodiment using an electrostatic actuator.

For example, in an electrostatic actuator shown in FIG. 11, none of a driving coil, a speed sensing coil, a permanent coil, and an electromagnetic yoke are present. Instead, there is provided a fixed electrode 52 secured to the two moving electrodes 51 and frame 4 by a fixing member (not shown) on the moving member. When a voltage is applied between the fixed electrode 52 and one moving electrode 51, a force of attraction acts between both of the electrodes, which deflects the moving member 6. When a voltage is applied between the fixed electrode 52 and the other moving electrode 51, the moving member 6 is deflected in the opposite direction. The way of causing the light to scan by the deflection of the moving member 6 is the same as when the electromagnetic actuator is used.

In the scanning mirror unit 2 of the embodiment, the moving member 6 is supported by a pair of torsion elastic member. As shown in FIG. 1, the torsion bar projects from the top and bottom of the moving member 6. To make the housing 3 shorter in the direction of height (in the direction parallel with axis IV–IV'), it is necessary to use a shorter torsion bar.

Figure 12:
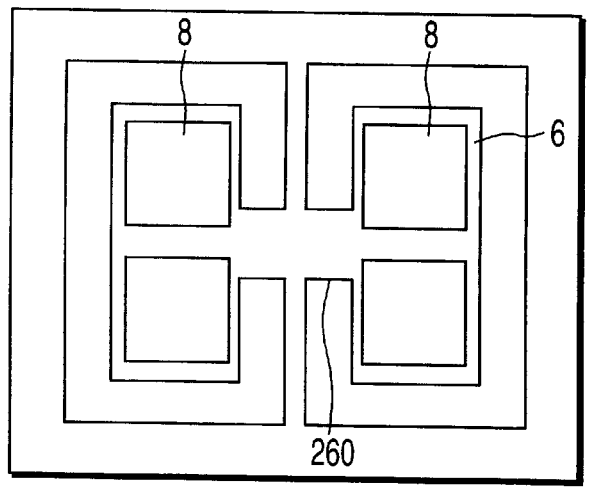
FIG. 12 shows a modification of the shape of the moving member 6.

As shown in FIG. 12, instead of being a square or a rectangle, the moving member 6 may be shaped so that the inside of the moving member 6 is cut out (into an H shape). The connector section of the elastic member 5 may be then provided and the PD 8 be split and placed on both sides of the cutouts 260. In the modification, even when the torsion bar is made longer than the scanning mirror unit 2 of FIG. 1, the overall dimensions are less liable to become larger. As a result, the allowable stress of the torsion bar is made greater with the same overall dimensions, improving the durability.

Figure 13:
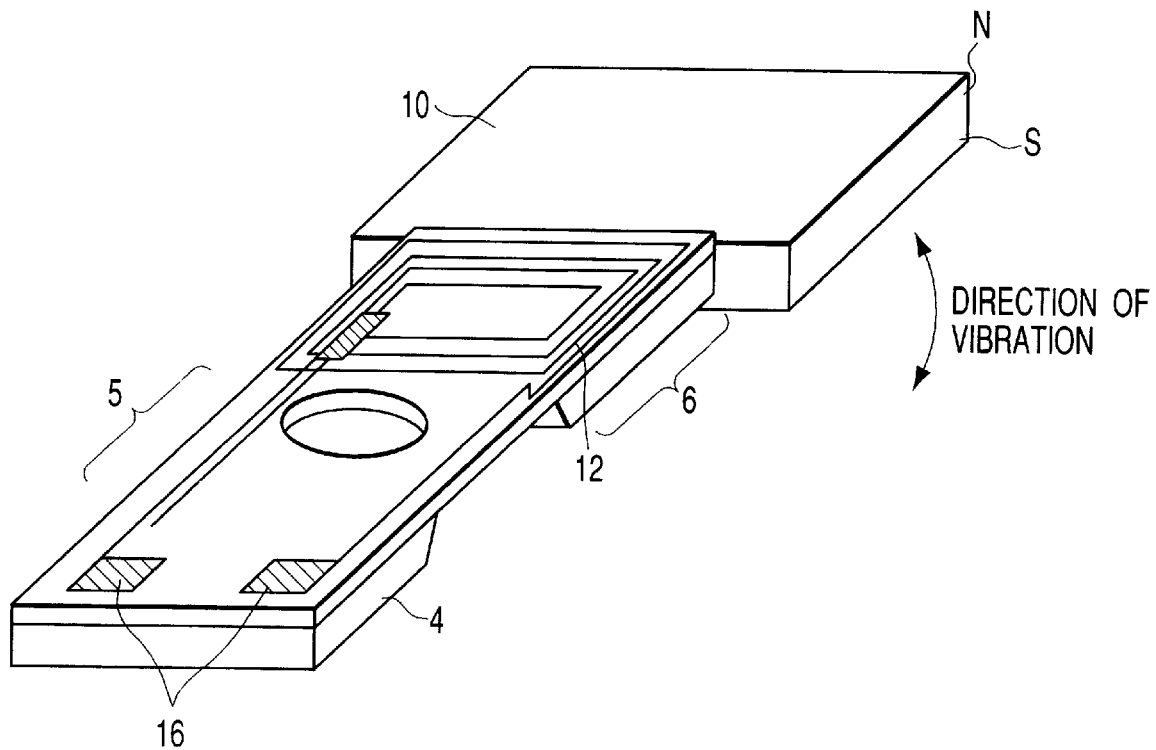
FIG. 13 shows a modification of the scanning mirror unit where the moving member 6 is supported by a cantilever elastic member.

Furthermore, a scanning mirror unit where the moving member 6 is supported by a cantilever elastic member 5 as shown in FIG. 13 may be used. The scanning mirror unit having a cantilever member has been disclosed in, for example, Jpn. Pat. Appln. KOKAI Publication. No. 10-20226. The frame 4, elastic member 5, and moving member 6 are constructed as shown in FIG. 13. Securing the frame 4 to a support member (not shown) causes the moving member 6 to be supported in a cantilever manner. On the moving member 6, the driving coil 12 electrically connected to the electrode pad 16 on the frame is formed. On the other hand, the permanent magnet 10 is fixed to a support member (not shown) and located adjacent to the driving coil 12. In FIG. 13, the reflecting mirror and PD are formed at the bottom surface. In the modification, when current is supplied to the driving coil 12, the moving member 6 is deflected, with the elastic member 5 divided in two by a hole being the center of rotation, and vibrates in the direction perpendicular to the surface.

Figure 14:
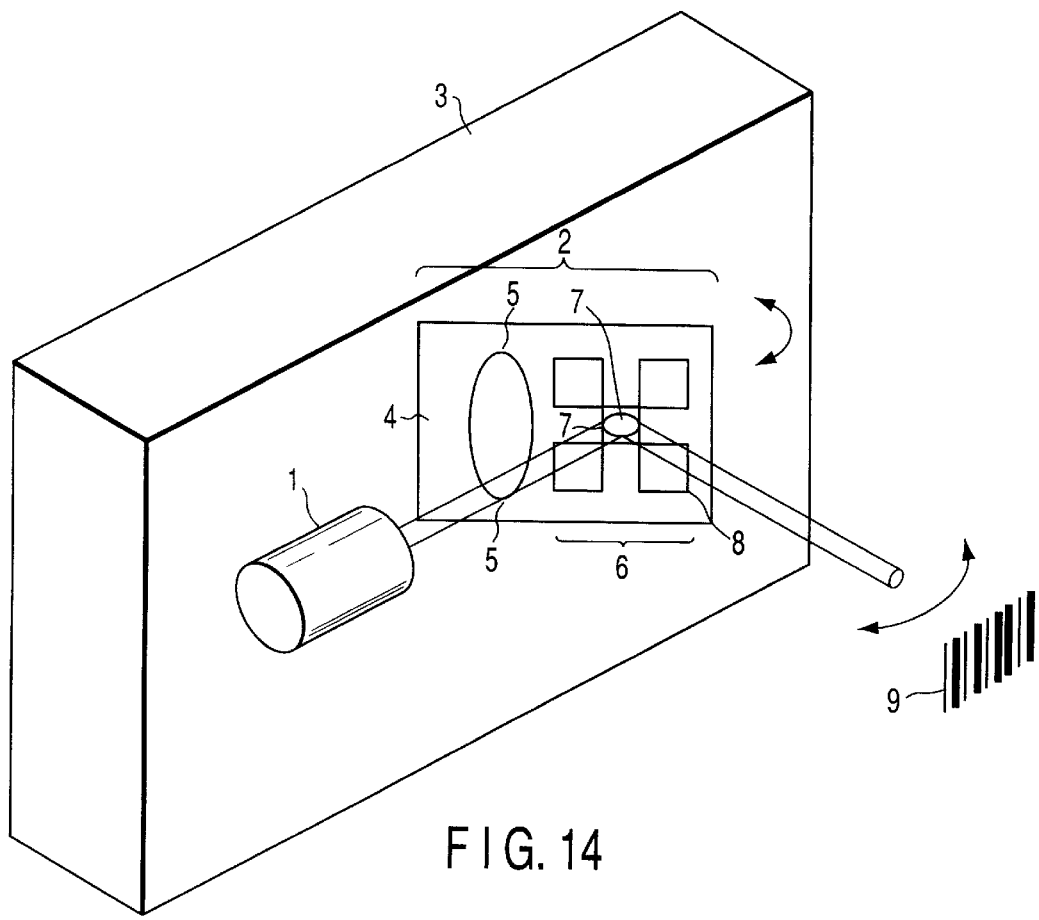
FIG. 14 shows a state where the scanning mirror unit of FIG. 13 is built in the bar code scanner.

FIG. 14 shows a state where the scanning mirror unit 2 of the modification has been built in the bar code scanner. Because the elastic member has no projection in the direction of height in FIG. 14, the scanner can be made more compact in the direction of height.

Figure 15:
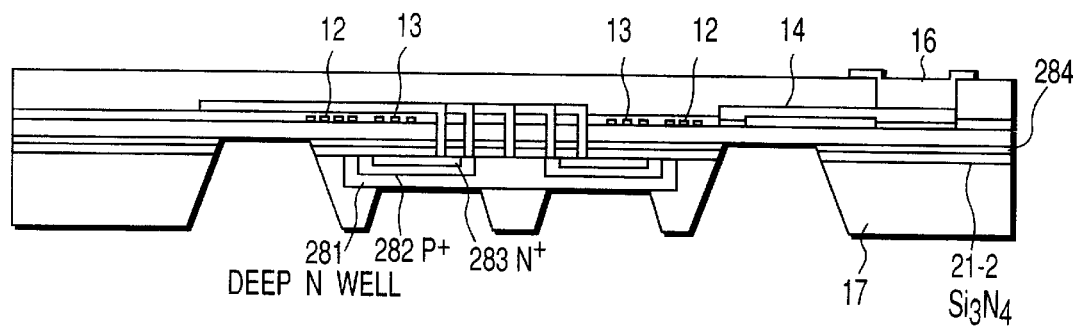
FIG. 15 is a sectional view of a modification where PD 8 is formed at the surface on which a driving coil is formed.

While in the embodiment, the PD has been formed on the surface on which the driving coil 12 of the moving member 6 has not been formed, it may be formed on the surface on which -the driving coil 12 is formed. This modification will be described by reference to FIG. 15. In FIG. 15, a p-type monocrystalline silicon substrate 17 is used to form a thermal oxidation film (not shown) on the surface on which the driving coil 12 is to be formed. After patterning, n-type impurities, such as phosphorus, p-type impurities, such as boron, and further n-type impurities are doped in that order to form a first n-type layer (deep N well) 281, a second p-type layer ($p^+$) 282, and a third n-type layer ($n^+$) 283. The n-type layer 181 is so formed at one place that it includes at least the entire area of the region in which the PD is to be formed. As in the above embodiment, the p-type layer 182 is split into four quadrants. At the surface of each quadrant of the n-type layer 282, an n-type layer 283 is formed. Thereafter, an elastic member and a film for a coil are formed, and patterning is done -to produce the same structure as that explained in the first embodiment. In this case, leads are drawn from the individual layers 281 to 283 into which impurities have been doped. They are passed through the elastic member through which the lead for the driving coil 12 does not pass, and are connected to an electrode pad (not shown) on the frame. Thereafter, the silicon substrate is etched at the bottom surface in the figure. At this time, the central portion of the bottom surface in the figure becomes a reflecting mirror. Therefore, the portion is masked from an etchant and the substrate at the region where the PD is to be formed is so etched that light reaches the p-n junction. At that time, with the substrate being biased negatively and the etchant being biased positively, when electrochemical etching is done by KOH, the etching is stopped at the first doped n-type impurity layer 281. The rib pattern is left on the etching mask to improve the stiffness of the moving section, producing the moving member 6 of the shape as shown in FIG. 16.

In the modification, the p-n junction between the first n-type layer (deep N well) 281 and the second p-type layer (p⁺) 282 functions as the PD 8'. The third n-type layer (n⁺) 283 produces the effect of reducing not only the dark current in the p-n junction but also noise. A structure without the third n-type layer (n⁺) 283, however, functions as the PD 8' as well. In that case, it is desirable that a conducting layer 284, such as Al, should be formed before the first insulating film is formed and be used as a shield layer, as shown in FIG. 15. The modification produces the effect of facilitating the wiring connection of the PD.

While the elastic member explained in the embodiment is composed of the insulating film formed at the surface of the silicon substrate as shown in FIG. 6, it is not restricted to this. For instance, etching may be done in such a manner that part of the substrate is left to produce an elastic member composed of silicon and an insulating film. Furthermore, the elastic member may be made of only silicon. In this case, the leads passing through the elastic member may be formed at the surface of, not inside, the elastic member. In the modification, because silicon with high stiffness and less internal loss can be used as an elastic member, the amplitude is ensured efficiently in the resonating state at high frequencies.

Furthermore, the reflectivity at the surface is suppressed at low levels (the transmittance is improved) by processing the surface of the PD 8 into a serrate (stair-like) shape 290 as shown in FIG. 17A in place of the AR coating of the first embodiment and bringing the incident angle of the light reflected and scattered from the bar code close to zero degree. The shape of the modification is realized to some extent by anisotropically etching, for example, the surface of a monocrystalline silicon to expose a <111> plane. Usually, the thickness of a film formed on the surface of the AR coating has to be controlled accurately. Because the present modification is formed by a manufacturing method dependent on the surface orientation of a crystal, a reproducible shape is realized with relative ease. Alternatively, the SiO₂ film formed on the PD surface may be anisotropically etched into a shape as shown in FIG. 17B, which produces a similar effect.

In addition, a short wavelength cut filter 48 and a long wavelength cut filter 46 may be provided on the surface of the PD 8 and the scanner window respectively, which produces a similar effect. The structure of the PD 8 is not limited to the aforementioned ones. For instance, the PD 8 may be integrated with a preamplifier or an computing circuit.

Hereinafter, a second embodiment of the present invention will be explained by reference to FIGS. 18 to 21.

Figure 19:
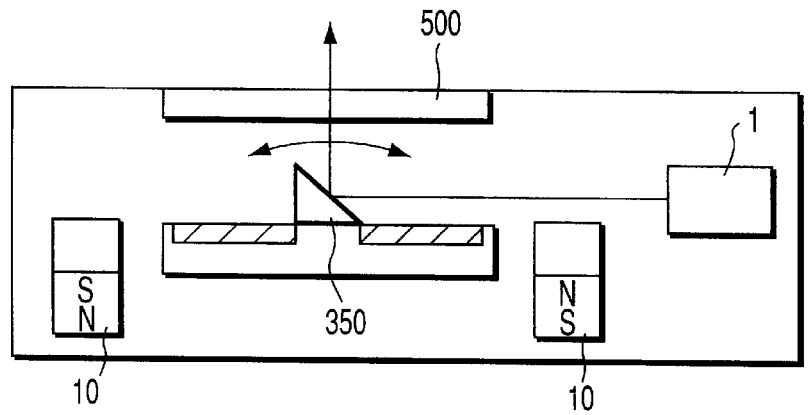
FIG. 19 is a sectional view taken along a plane including the axis of the emitted light and the axis of the incident light of FIG. 18.

FIG. 18 is a plan view of a bar code scanner according to the second embodiment, viewed from the axis of the emitted light. FIG. 19 is a sectional view taken along a plane including the axis of the emitted light and the axis of the incident light (like FIG. 15 in the first embodiment). The second embodiment differs from the first embodiment only in the configuration of the optical scanning unit and the location of parts. Therefore, an explanation of the parts of the second embodiment common to those of the first embodiment will not be given.

To the central portion of the moving member 6 of the optical scanning unit shown in FIGS. 18 and 19, a prism (45-degree mirror) 350 with a reflecting surface inclined at 45 degrees to the surface of the moving member 6 is bonded. In the region of the surface of the moving member 6 where the prism 350 has not been bonded, a PD 8 split into four quadrants is formed. The PD 8 is not formed near an axis passing through the center of gravity of the moving member 6 in the direction perpendicular to the direction in which a torsion bar extends. The moving member 6 has a cutout 351 in it. At the surface of the PD 8, an AR coating (not shown) and a long wavelength cut filter are formed. A short wavelength cut filter 500 is provided on a scanner window.

The operation of the second embodiment will be explained. The light emitted from the LD (not shown) built in the light source module 1 passes through a condenser lens (not shown) built in the light source module 1 and becomes a luminous flux with a diameter equal to a specific value or less. The flux strikes the reflecting surface of the prism 350, is reflected almost vertically toward the surface of the moving member 6 of the scanning mirror unit 2, and illuminates a bar code (not shown) outside. The light reflected and scattered from the bar code reach the PD 8 formed integrally with the surface of the moving member 6 and is sensed there. When the moving member 6 is deflected, part of the moving member 6 might block the emitted light from the light source unit 1. To prevent this, the relevant part of the moving member 6 is cut out.

As explained above, the basic operation of the second embodiment is the same as that of the first embodiment, producing a similar effect. In addition, the effects unique to the second embodiment will be described. Because the prism 350 is used as the reflecting surface in the second embodiment, the emitted light is almost perpendicular to the surface of the moving member 6 when the moving member is in the neutral position. This makes it possible to cause the moving member 6 to stand right in front of the bar code 9, which decreases the incident angle of the light reflected and scattered from the bar code 9 to the PD 8. As a result, with the same range of sensible scattered light, the effective area of the prism 350 is reduced to about 1/1.4, which makes the bar code scanner still more compact and decrease the power consumption further.

Figure 20:
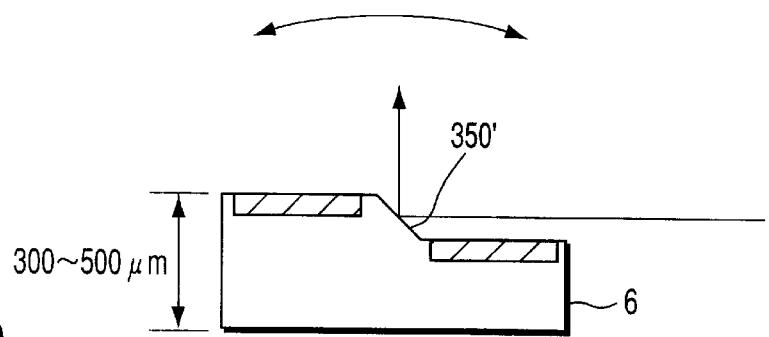
FIG. 20 shows the moving section of a modification where a prism is integrally formed by the anisotropic etching of silicon.

The configuration of the second embodiment may be modified in still other ways. All the modifications explained in the first embodiment are applicable to the second embodiment. While in the second embodiment, the prism 350 has been bonded integrally to the optical scanning unit, it may be formed monolithically by anisotropic etching of silicon. FIG. 20 shows the moving member 6 of such a configuration. In the present modification, a substrate the crystal orientation of whose surface has been offset 9 degrees from a <100> plane is used to form a specific mask. Then, etching is done using an etchant, such as KOH, which causes a <111> plane to appear. Because the surface of the substrate has been offset from the <100> plane, a plane inclined at 45 degrees to the surface of the substrate exists in the <111> plane appeared as a result of the etching. In this state, the PD 8 is formed in a specific position and a metal enhancement reflecting film is formed on a 45-degree inclined surface, which performs a similar operation to that of the prism 350. Because the dimensions of the mirror 350' formed by the etching are limited within the thickness of the substrate (normally, within about 0.5 mm), its applications are limited to systems capable of making the diameter of light flux small beforehand. Use of a thick wafer, however, makes it possible to secure a certain amount of area. In the modification, the mirror 350' is formed integrally with the moving member 6 and PD 8 of the scanning mirror unit 2, which not only produces a similar effect to that in the second embodiment but also reduces the number of component parts and therefore assembly costs because the prism 350 is not needed.

Figure 21A:
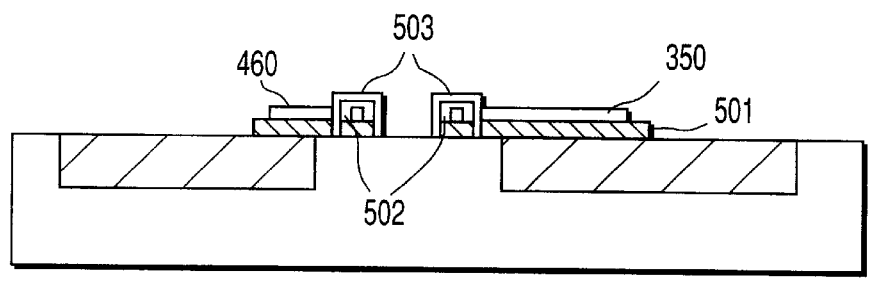
FIGS. 21A and 21B show the moving section of a modification where the mirror is formed by a method called "Pister structure"
Figure 21B:
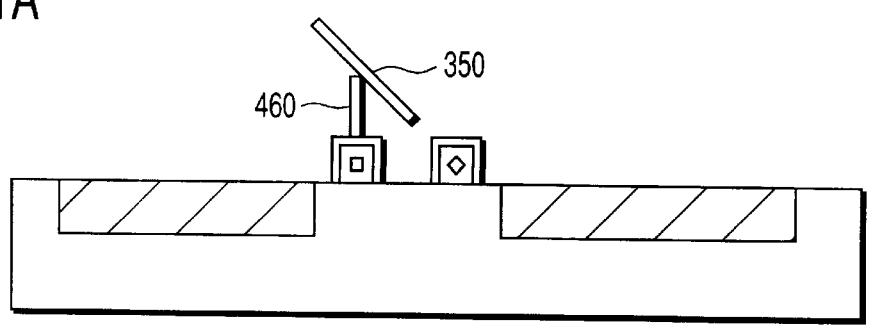

Another modification is to form a mirror by a method called a Pister structure as shown FIGS. 21A and 21B. With the method, a first sacrifice layer 501 is formed of silicon oxide in advance as shown in FIG. 21A. On the first sacrifice layer 501, a mirror 350, a stopper 460, a second sacrifice layer 502, and a hinge 503 are formed in that order. After the removal of the sacrifice layers, the mirror 350 and stopper 460 are bent in the direction of arrow using the hinge 503 as a fulcrum. Thereafter, the mirror 350 is secured at an angle of 45-degree to the surface of the substrate by the stopper 460. The method has been disclosed in, for example, L. Y. Lin, et al., "Microactuated micro-XYZ stages for free-space micro-optical bench," Proceedings of MEMS-97.

Hereinafter, a third embodiment of the present invention will be explained by reference to FIGS. 22 to 26.

Figure 22:
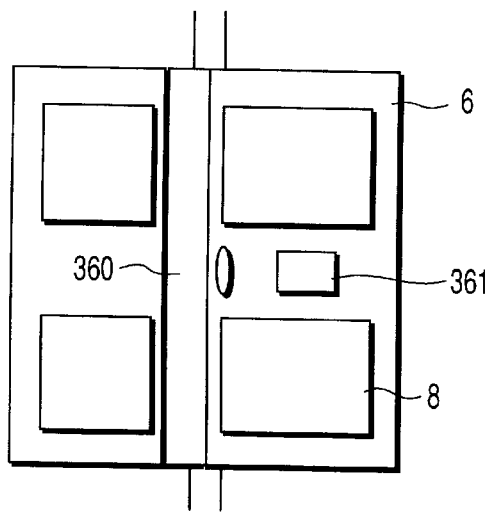
FIG. 22 is a plan view of a bar code scanner according to a third embodiment of the present invention, viewed from the axis of the emitted light.
Figure 23:
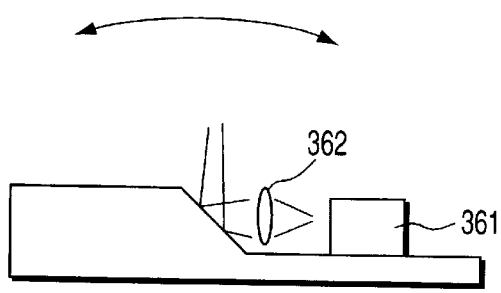
FIG. 23 is a sectional view of the bar code scanner of FIG. 22 taken along a plane including the axis of the emitted light and the axis of the incident light.

FIG. 22 is a plan view of a bar code scanner according to the third embodiment, viewed from the axis of the emitted light (like FIG. 18 in the second embodiment). FIG. 23 is a sectional view taken along a plane including the axis of the emitted light and the axis of the incident light (like FIG. 19 in the second embodiment).

As in the modification of the second embodiment, in the third embodiment, a silicon monocrystalline substrate the crystal orientation of whose surface has been offset 9 degrees from a <100> plane is used to form a reflecting mirror 360 with an inclination of 45-degrees. Then, a PD 8 is formed in a specific position. The third embodiment is characterized in that a light source and a condenser lens are formed integrally on the moving member 6. This will be explained in detail below.

Figure 24:
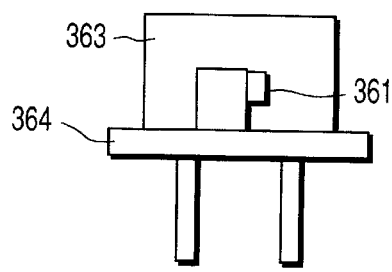
FIG. 24 shows the mounting of an LD chip.

After power supply leads (not shown), electrode pads, and others are formed, an LD chip 361 is mounted on the moving member 6. In the first and second embodiments, the LD chip 361 has generally been mounted in a metal package called a stem 364 as shown in FIG. 24. Bonding wires (not shown) have been electrically connected to the LD chip, which has been then covered with a protective cap 363. The resulting LD chip has been used as a light source. However, when a reflecting mirror with a limited area is used as in the modification of the second embodiment or in the third embodiment, it is difficult to bring the light source close to the reflecting mirror. Another problem is that the package is much larger than the chip itself.

When the LD chip 361 is mounted directly near the mirror, this avoids the above problems. Since the emitted light from the LD chip 361 generally advances while spreading, the application of the LD chip 361 to a bar code scanner requires a condenser lens 362. In the third embodiment, the condenser lens 362 is also mounted on the moving member 6. The mounting of the LD chip 361 and condenser lens 362 needs positioning. By forming steps (not shown) or grooves in the mounting section of the moving member 6 beforehand by anisotropic etching, accurate positioning is effected easily. Mounting the light source on the moving member requires twice the deflection angle of the moving member in mounting the light source on the fixed section, to secure the same optical deflection angle.

In the third embodiment, because the LD chip 361 is mounted on the moving member 6, the bar code scanner has no parts other than the scanning mirror unit 2, which makes the scanner still more compact. The cutouts in the moving member 6 are not needed, which makes the effective area of the PD 8 greater than that in the modification of the second embodiment. Even when the area of the mirror formed integrally with the moving member 6 is limited, it is possible to make maximum use of the area of the mirror by bringing the light source close to the reflecting mirror 360.

The configuration of the third embodiment may be modified in still other ways. All the modifications explained in the first and second embodiments are applicable to the third embodiment. A reflecting mirror with a 45-degree inclined surface may be used as in the second embodiment.

As a modification unique to the third embodiment, a condenser lens and an LD chip may be integrated monolithically. Hereinafter, this will be explained by reference to FIGS. 25 and 26.

Figure 25:
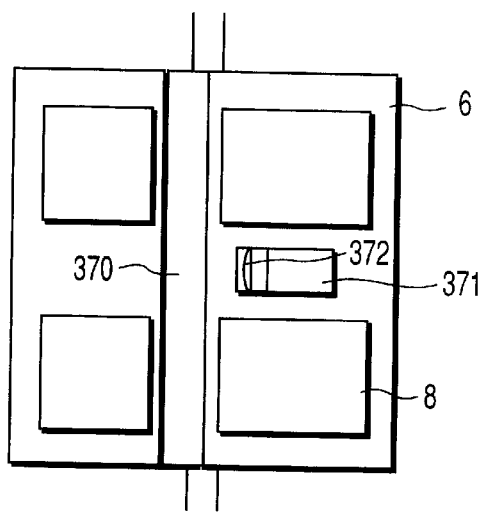
FIG. 25 is a plan view of a bar code scanner using an integral structure of an LD and a condenser lens as a light source, viewed from the axis of the emitted light.
Figure 26:
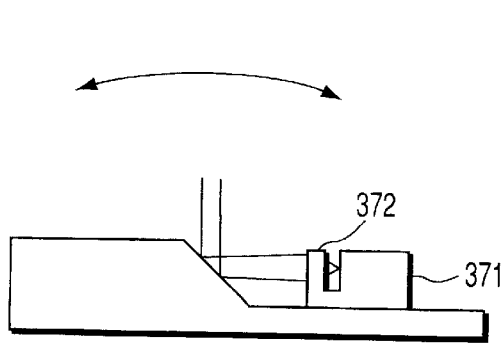
FIG. 26 is a sectional view of the bar code scanner of FIG. 25 taken along a plane including the axis of the emitted light and the axis of the incident light.

FIGS. 25 and 26 are diagrams to help explain a case where a monolithic integration of an LD chip and a condenser lens is used as a light source. FIGS. 25 and 26 correspond to FIGS. 22 and 23, respectively. In the present modification, a method of forming an LD differs from an ordinary one and is suitable for a monolithic integration of condenser lens. This method has been disclosed in detail in, for example, J. Shimada, et al., "Gradient-index microlens formed by ion-beam sputtering," Appl. Opt. 31 (1992) 5230–5236. The method will be explained briefly below. Both ends of a conventional LD chip have crystal surfaces with specific surface orientations formed by the cleavage of a wafer. An optical resonator using the crystal surfaces as reflecting mirrors is constructed inside the chip and causes laser oscillations. Because the chip does not function as a light source unless it is separated by cleavage, a monolithic integration of lens and others is unattainable. In contrast, the LD used in the present modification is characterized in that the reflecting mirror is formed by dry-etching a wafer. Therefore, optical elements, including a condenser lens, can be formed monolithically on the same substrate by dry-etching.

In the modification, for example, the substrate is etched in such a manner the substrate tales the form of a plano-convex lens when viewed in the direction perpendicular to the substrate. On the other hand, there is no freedom of shape in the direction perpendicular to the substrate in dry-etching. Basically, only a shape with a side perpendicular to the substrate can be processed. In the modification, a thin film having a refractive index distribution in the direction of depth is formed over the portion of the condenser lens 372 to give a light gathering characteristic in the direction perpendicular to the substrate. In the modification, because the condenser lens 372 has been formed integrally with the LD chip 371 monolithically, the alignment of them is not needed and the number of assembly steps decreases, which stabilizes the performance and reduces the manufacturing costs.

While in the third embodiment, the condenser lens 362 or 372 is formed adjacent to the LD chip 261 or 371, the positional relationship between them is not limited to this. For instance, the condenser lens 372 may be provided adjacent to the short wavelength cut filter 48.

Hereinafter, a fourth embodiment of the present invention will be explained by reference to FIGS. 27 to 31.

Figure 27:
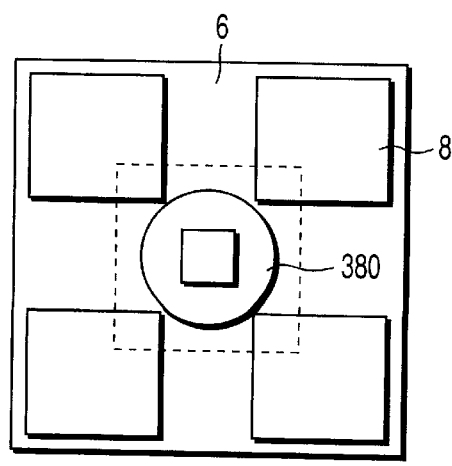
FIG. 27 is a plan view of a bar code scanner according to a fourth embodiment of the present invention, viewed from the axis of the emitted light.
Figure 32:
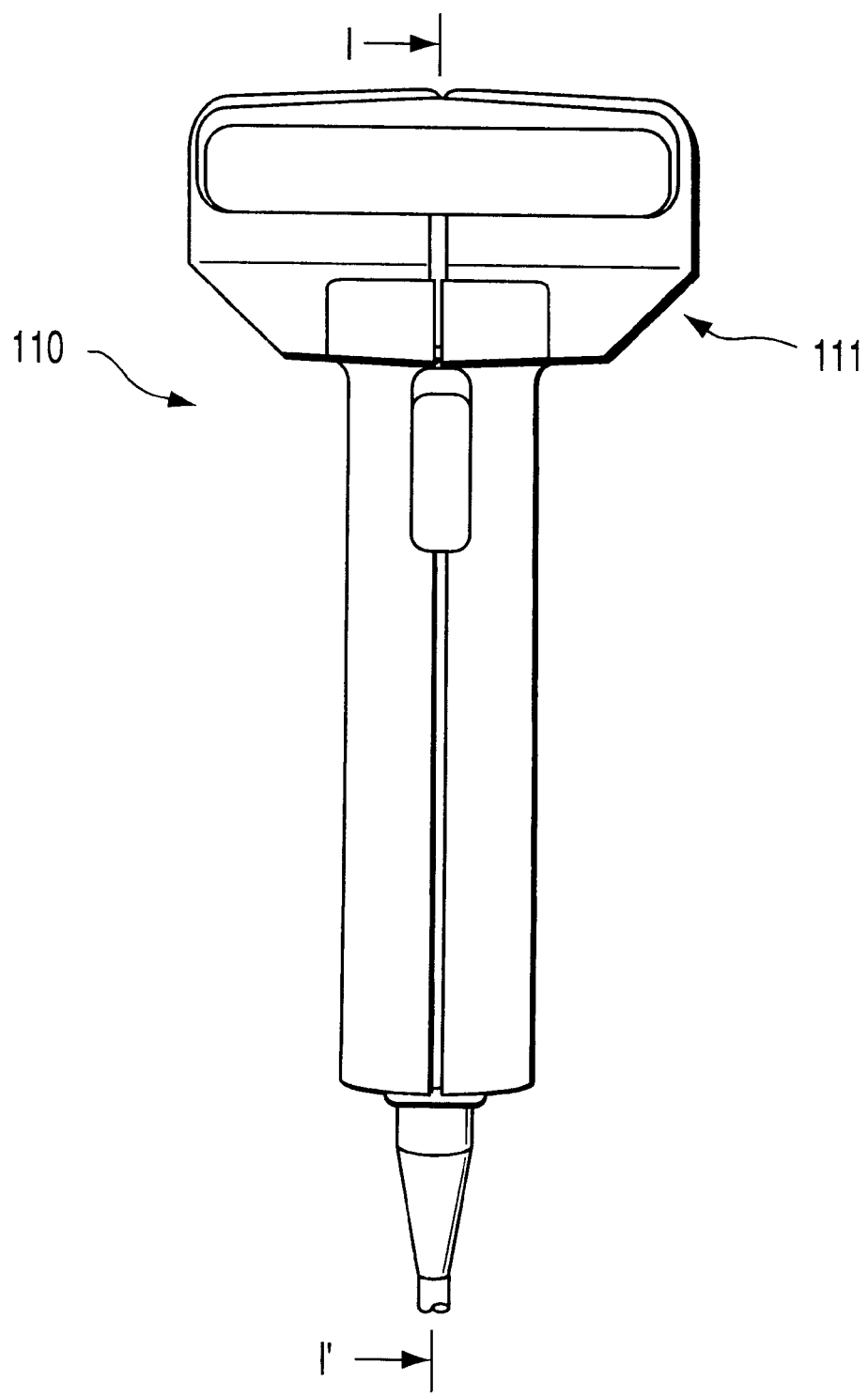
FIG. 32 is a plan view of a laser scanning head used in a conventional bar code scanner.
Figure 33:
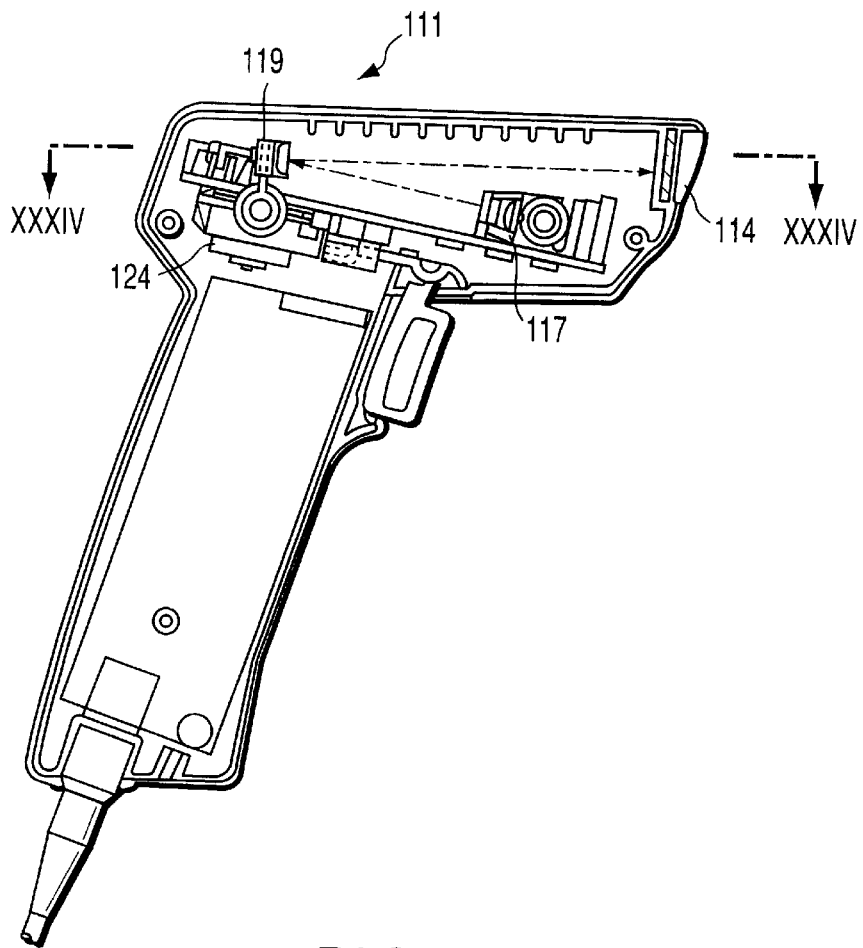
FIG. 33 is a vertical sectional view taken along line I–I' of FIG. 32.
Figure 34:
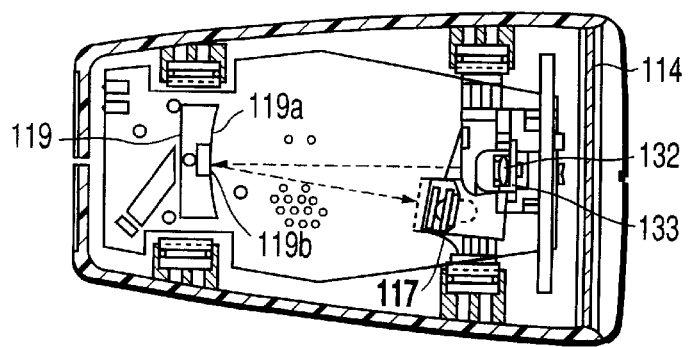
FIG. 34 is a transverse sectional view taken along line XXXIV–XXXIV' of FIG. 33.

FIG. 27 is a plan view of a bar code scanner according to the fourth embodiment, viewed from the axis of the emitted light (like FIG. 18 in the second embodiment). FIG. 28 is a sectional view taken along a plane including the axis of the emitted light and the (like FIG. 19 in the second embodiment). The fourth embodiment is characterized by using a vertical-cavity surface-emitting laser (hereinafter, referred to as a VCSEL) 382 for projecting light vertically on the surface of a wafer as a light source. As in the first to third embodiments, PD 8 are formed in four specific positions on the surface of the moving member 6 in the scanning mirror unit 2. On the surface of the PD 8, if necessary, an AR coating or a long wavelength cut filter is formed. Then, a $SiO_2$ film 381 is formed to a specific thickness. In the central portion of the moving member 6, a plano-convex condenser lens 380 is integrally formed. Since in the fourth embodiment, the VCSEL 382 itself can emit light in the direction perpendicular to the substrate, a reflection mirror is not required. On the other hand, at the surface of the wafer on the opposite side, an actuator, a sensing element, an electrode pad connected to the light source, and leads are formed, with a through hole 600 made in the central portion. In this state, when a surface-emitting laser is mounted on the surface at which the PD 8 of the moving member 6 have been not formed, this completes the configuration of the fourth embodiment.

The condenser lens 380 is formed as follows. After a photoresist is patterned into a lens shape (normally a round shape) at the surface of $SiO_2$, lens material, the photoresist is heated to about 200° C. Then, the photoresist is transformed into an almost spherical shape due to surface tension. With the resulting photoresist as a mask, the almost spherical shape is transferred to the $SiO_2$ by dry etching, thereby completing the condenser lens 380. When a spherical lens is used with the VCSEL 382 as a light source, the resulting spot is almost round. In the bar code scanner, when the spot diameter is made smaller in the direction of scanning and larger in the direction perpendicular to scanning (in the direction parallel to the lines of the bar code), the bar code is immune to dust or dirt on the bar code. For this reason, the elliptic beam characterizing the edge emitting LD may be used in a specific direction without being shaped. In the fourth embodiment, when a spot of such a shape is needed, it can be realized by a method of patterning the opening in the surface of the VCSEL 382 into a rectangular one longer in a specific direction or by a method of forming a cylindrical lens, not a spherical one (by patterning the photoresist into a rectangle).

With the fourth embodiment, use of the VCSEL as a light source makes it unnecessary to use a prism or a mirror, which has been needed in the second and third embodiments. This enables an ordinary <100> monocrystalline silicon wafer to be used. In addition, the lens integration process is simple and the shape is determined rather freely, which facilitates the optical design.

The configuration of the fourth embodiment may be modified in still other ways. All the modifications explained in the first embodiment are applicable to the fourth embodiment. As a modification unique to the fourth embodiment, the condenser lens and the VCSEL are integrally formed. FIG. 29 shows a modification where the condenser lens 380 is integrally formed at the surface of the substrate of the VCSEL 382. In the modification, at the end of the step of producing the VCSEL 382, a photoresist is patterned into a specific shape at the bottom surface of the GaAs substrate as in the method explained in the fourth embodiment. Then, the photoresist is heated and transformed into a lens shape. The resulting photoresist is transferred to the GaAs by dry etching. Thereafter, the completed VCSEL 382 chip is mounted on the moving member of the optical scanning unit, with the bonding surface being the surface on which the condenser lens 380 has not been formed. If necessary, an output monitor PD (hereinafter, referred to as an MPD) may be formed in part of the moving member on which the VCSEL 382 is mounted, at the same time that the sensing PD is formed, and the output of the monitor PD may be used to perform APC (Automatic Power Control) to keep the output of the LD at a constant value.

Furthermore, as shown in FIG. 30, instead of the VCSEL, an SEL 383 of the horizontal-cavity type may be used and the condenser lens 380 be formed integrally with the substrate in a similar manner. In the present modification, the step of forming a film for the condenser lens 380 is not needed and therefore the manufacturing costs are reduced. As a modification of the modification, a condenser lens may be formed at the surface of the VCSEL. In this case, it is necessary to form a film for the formation of a condenser lens.

FIG. 31 shows another modification where a sensing PD, a light source, and a condenser lens are all integrated monolithically. In this modification, the process of producing an optical scanning module is started using an n-type GaAs substrate 410 instead of a silicon substrate used in the above explanation. First, to form a PD 8 at the bottom surface of the n-type GaAs substrate 410, p-type impurities, such as Zn, are diffused, with specific portions of the substrate being masked. Then, a VCSEL 412 is formed at the surface, followed by the formation of an elastic member, a driving coil 12, and a speed sensing coil 13 in that order. In the final step, a condenser lens is formed at the bottom surface and then the moving member 6 is separated from the frame by etching, which completes the process.

As a further modification of the present modification, an SEL of the horizontal-cavity type may be used in place of the VCSEL. In addition, the VCSEL, PD, and condenser lens may be all integrally formed at the surface. In this case, a film of a condenser lens material has to be formed, but another diffused layer need not be formed in the region where a PD is to be formed. Therefore, the formation of a film for lens material is realized by the crystal grown layer at the time of the formation of the VCSEL and the patterning of the grown layer.

In the modification, because the light source, PD, and condenser lens have been integrated monolithically into the moving member, all of the assembly steps can be eliminated, reducing manufacturing costs. Because the PD is formed of compound semiconductor, high-speed response is assured. In the modification, the substrate material is compound semiconductor, such as GaAs, which is inferior to silicon in mechanical characteristics. Consequently, the compound semiconductor is not always suitable for an elastic member. Therefore, it is desirable that a film of an insulating material formed on the surface of the substrate should be used for an elastic member as explained in the first embodiment.

As explained above in detail, with the present invention, it is possible to provide an optical scanning device capable of reducing the number of component parts constituting the optical scanning device while making use of the advantages of the prior art and thereby not only making the device more compact but also reducing costs.

The embodiments described above are illustrative and not restrictive. The present invention has the configurations described below.

1. An optical scanning device comprising:

a light source;

a condenser lens that gathers rays of emitted light from the light source;

a reflecting section that reflects the light gathered by the condenser lens;

an optical scanning section which includes a fixed section and a moving section and which causes the light reflected by the reflecting section to scan an object to be scanned; and a photodetecting section that receives and detects light returned from the object scanned by the optical scanning section, wherein the reflecting section and the photodetecting section are integrally formed on the moving section of the optical scanning section.

(Embodiments corresponding to the invention)

The first to third embodiments correspond to the invention.

(Effect)

Because the reflecting section, the moving section of the optical scanning section, and the photodetecting section are integrally formed, this produces the effect of reducing the number of component parts, making the scanning device more compact, and reducing costs while making use of the advantages in the prior art.

2. In the optical scanning device of the structure in item 1, a reflecting surface of the reflecting section and a light-receiving surface of the photodetecting section are provided in such a manner that they form a specific angle.

(Embodiments corresponding to the invention)

The second and third embodiments correspond to the invention.

(Effect)

Because the incident angle of the incident light to the photodetecting section is small, the same effect is achieved with the smaller photodetecting section. As a result, the scanning device is made more compact and produced at lower costs.

3. In the optical scanning device of the structure in item 2, the reflecting section and the moving section of the optical scanning section are integrated monolithically.

(Embodiments corresponding to the invention)

The second and third embodiments correspond to the invention.

(Effect)

Because the reflecting section and the moving section of the optical scanning section are integrated monolithically, this produces the effect of reducing not only the number of component parts but also the number of assembly steps and therefore reducing costs.

4. In the optical scanning device of the structure in any one of items 1 to 3, the light source, the reflecting section, the moving section of the optical scanning section, and the photodetecting section are integrally formed.

(Embodiment corresponding to the invention)

The third embodiment corresponds to the invention.

(Effect)

Because the light source, the reflecting section, the moving section of the optical scanning section, and the photodetecting section are integrally formed, this produces the effect of making the scanning device more compact and reducing costs as a result of a reduction in the number of component parts. Furthermore, the light source may be located close to the reflecting section, which would make the reflecting section more compact.

5. In the optical scanning device of the structure in item 4, the light source, the condenser lens, the reflecting section, the moving section of the optical scanning section, and the photodetecting section are integrally formed.

(Embodiment corresponding to the invention)

The third embodiment corresponds to the invention.

(Effect)

Because the light source, the condenser lens, the reflecting section, the moving section of the optical scanning section, and the photodetecting section are integrally formed, this produces the effect of making the scanning device more compact and reducing costs as a result of a reduction in the number of component parts. Furthermore, the integral structure of the light source and condenser lens enables a spot less affected by aberration to be formed on a bar code.

6. In the optical scanning device of the structure in item 5, the light source and the condenser lens are integrated monolithically.

(Embodiment corresponding to the invention)

The third embodiment corresponds to the invention.

(Effect)

Because the light source and the condenser lens are integrated monolithically, this produces the effect of making the scanning device more compact and reducing costs as a result of reducing not only the number of component parts but also the number of assembly and adjustment steps.

7. An optical scanning device comprising:

a light source;

a condenser lens that gathers rays of light from the light source;

an optical scanning section which includes a fixed section and a moving section and which causes the light gathered by the condenser lens to scan an object to be scanned; and a photodetecting section that receives and detects light returned from the object scanned by the optical scanning section, wherein the light source and the photodetecting section are integrally formed on the moving section of the optical scanning section.

(Embodiment corresponding to the invention)

The fourth embodiment corresponds to the invention.

(Effect)

Because the light source, the moving section of the optical scanning section, and the photodetecting section are integrally formed, this produces the effect of making the scanning device more compact and reducing costs as a result of reducing not only the number of component parts but also the number of assembly and adjustment steps.

8. In optical scanning device of the structure in item 7, the light source, the condenser lens, the moving section of the optical scanning section, and the photodetecting section are integrally formed.

(Embodiment corresponding to the invention)

The fourth embodiment corresponds to the invention.

(Effect)

Because the light source, the condenser lens, the moving section of the optical scanning section, and the photodetecting section are integrally formed, this produces the effect of making the scanning device more compact and reducing costs as a result of reducing not only the number of component parts but also the number of assembly and adjustment steps. Furthermore, the integral structure of the light source and condenser lens enables a spot less affected by aberration to be formed on a bar code.

9. In the optical scanning device of the structure in item 8, the moving section of the optical scanning section and the condenser lens are integrated monolithically.

(Embodiment corresponding to the invention)

The fourth embodiment corresponds to the invention.

(Effect)

Because the moving section and the condenser lens are integrated monolithically, this produces the effect of making the scanning device more compact and reducing costs as a result of reducing not only the number of component parts but also the number of assembly and adjustment steps. In addition, because the light source can be separated somewhat from the condenser lens, this gives flexibility to the optical design.

10. In the optical scanning device of the structure in item 8, the light source and the condenser lens are integrated monolithically.

(Embodiment corresponding to the invention)

The fourth embodiment corresponds to the invention.

(Effect)

Because the light source and the condenser lens are integrated monolithically, this produces the effect of making the scanning device more compact and reducing costs as a result of reducing not only the number of component parts but also the number of manufacturing, assembly, and adjustment steps.

11. In the optical scanning device of the structure in any one of item 8 to item 10, the light source, the condenser lens, and the moving section of the optical scanning section are integrated monolithically.

(Embodiment corresponding to the invention)

The fourth embodiment corresponds to the invention.

(Effect)

Because the light source, the condenser lens, and the moving section of the optical scanning section are integrated monolithically, this produces the effect of making the scanning device more compact and reducing costs as a result of reducing not only the number of component parts but also the number of manufacturing, assembly, and adjustment steps.

12. In the optical scanning device of the structure in any one of item 1 to item 11, the moving section of the optical scanning section and the photodetecting section are integrated monolithically.

(Embodiments corresponding to the invention)

The first to fourth embodiments correspond to the invention.

(Effect)

Because the moving section of the optical scanning section and the photodetecting section are integrated monolithically, this produces the effect of making the scanning device more compact and reducing costs as a result of reducing not only the number of component parts but also the number of assembly and adjustment steps.

13. In the optical scanning device of the structure in any one of item 1 to item 12, the photodetecting section is divided into photodetecting subsections.

(Embodiment corresponding to the invention)

The first to fourth embodiments correspond to the invention.

(Effect)

Because the photodetecting section is divided into photodetecting subsections and each photodetecting subsection has a smaller area, this not only improves the response characteristic of each element but also makes the photodetecting section compatible with a high-speed optical scanning device. Use of signals from the photodetecting subsections produces the effect of reducing errors in reading by removing an adverse effect of abnormal reflection.

14. In the optical scanning device of the structure in any one of item 1 to item 13, a reflectivity reducing section is provided at a surface of said photodetecting section.

(Embodiments corresponding to the invention)

The first to fourth embodiments correspond to the invention.

(Effect)

Because the photodetecting section has a reflectivity reducing section at its surface, the increase of the sensitivity produces the effect of achieving a higher performance.

15. In the optical scanning device of the structure in any one of item 1 to item 14, a wavelength selecting section is provided at a surface of said photodetecting section.

(Embodiments corresponding to the invention)

The first to fourth embodiments correspond to the invention.

(Effect)

Because the photodetecting section has a wavelength selecting section at its surface, this produces not only the effect of achieving a higher performance by reducing an adverse effect of external light but also the effect of reducing costs by lowering the costs of component parts.

16. In the optical scanning device of the structure in any one of item 1 to item 15, the moving section of the optical scanning section has an electrical element for driving the moving section on the optical scanning section, and an electrical shielding section is provided between the electrical element and the photodetecting section.

(Embodiments corresponding to the invention)

The first to fourth embodiments correspond to the invention.

(Effect)

Because the moving section of the optical scanning section has an electrical element for driving the moving section on it and an electrical shielding section is provided between the electrical element and the photodetecting section, this produces the effect of achieving a higher performance by reducing an adverse effect of the electric signal applied to the electrical element on the photodetecting section.

17. In the optical scanning device of the structure in any one of item 1 to item 16, the moving section of the optical scanning section has an electrical element for driving the moving section on the optical scanning section, and the photodetecting section is formed at a surface opposite to a surface of the moving section at which the electrical element is formed.

(Embodiments corresponding to the invention)

The first to fourth embodiments correspond to the invention.

(Effect)

Because the photodetecting section is formed at the surface opposite to that of the moving section at which the electrical element is formed, the device can be made more compact while securing the effective area of the moving section of the optical scanning section. This produces not only the effect of making the scanner more compact but also the effect of achieving a higher performance by making the device faster.

18. In the optical scanning device of the structure in any one of item 1 to item 16, the moving section of the optical scanning section has an electrical element for driving the moving section on the optical scanning section, and the photodetecting section is formed at a same surface of the moving section at which the electrical element is formed.

(Embodiments corresponding to the invention)

The first to fourth embodiments correspond to the invention.

(Effect)

Because the photodetecter section is formed at the same surface as that of the moving section at which the electrical element is formed, this produces the effect of facilitating wiring connection to external circuitry.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical scanning device comprising:
   a light source;
   a condenser lens that gathers rays of emitted light from said light source;
   a reflecting section that reflects the light gathered by said condenser lens;
   an optical scanning section which includes a fixed section and a moving section and which causes the light reflected by said reflecting section to scan an object to be scanned; and
   a photodetecting section that receives and detects light returned from said object scanned by said optical scanning section,
   wherein said reflecting section and said photodetecting section are integrally formed on the moving section of said optical scanning section.

2. An optical scanning device according to claim 1, wherein a reflecting surface of said reflecting section and a light-receiving surface of said photodetecting section are provided in such a manner that they form a predetermined angle such that the incident angle of the light reflected by the reflecting section onto the photodeflecting section is small.

3. An optical scanning device according to claim 2, wherein said reflecting section and the moving section of said optical scanning section are integrated monolithically.

4. An optical scanning device according to claim 1, wherein said light source, said reflecting section, the moving section of said optical scanning section, and said photodetecting section are integrally formed.

5. An optical scanning device according to claim 4, wherein said light source, said condenser lens, said reflecting section, the moving section of said optical scanning section, and said photodetecting section are integrally formed.

6. An optical scanning device according to claim 5, wherein said light source and said condenser lens are integrated monolithically.

7. An optical scanning device according to claim 1, wherein the moving section of said optical scanning section and said photodetecting section are integrated monolithically.

8. An optical scanning device according to claim 1, wherein said photodetecting section is divided into plural parts.

9. An optical scanning device according to claim 1, wherein a reflectivity reducing section is provided at a surface of said photodetecting section.

10. An optical scanning device according to claim 1, wherein a wavelength selecting section is provided at a surface of said photodetecting section.

11. An optical scanning device according to claim 1, wherein the moving section of said optical scanning section has an electrical element for driving the moving section on the optical scanning section, and an electrical shielding section is provided between the electrical element and said photodetecting section.

12. An optical scanning device according to claim 1, wherein the moving section of said optical scanning section has an electrical element for driving the moving section on the optical scanning section, and said photodetecting section is formed at a surface opposite to a surface of said moving section at which said electrical element is formed.

13. An optical scanning device according to claim 1, wherein the moving section of said optical scanning section has an electrical element for driving the moving section on the optical scanning section, and said photodetecting section is formed at a same surface of said moving section at which said electrical element is formed.

14. An optical scanning device comprising:
    a light source;
    a condenser lens that gathers rays of light from said light source;
    an optical scanning section which includes a fixed section and a moving section and which causes the light gathered by said condenser lens to scan an object to be scanned; and
    a photodetecting section that receives and detects light returned from said object scanned by said optical scanning section,
    wherein said light source and said photodetecting section are integrally formed on the moving section of said optical scanning section.

15. An optical scanning device according to claim 14, wherein said light source, said condenser lens, the moving section of said optical scanning section, and said photodetecting section are integrally formed.

16. An optical scanning device according to claim 15, wherein the moving section of said optical scanning section and said condenser lens are integrated monolithically.

17. An optical scanning device according to claim 15, wherein said light source and said condenser lens are integrated monolithically.

18. An optical scanning device according to claim 15, wherein said light source, said condenser lens, and the moving section of said optical scanning section are integrated monolithically.

* * * * *

UNITED STATES PATENT AND TRADEMARK OFFICE
CERTIFICATE OF CORRECTION

PATENT NO.    : 6,311,894 B1                                              Page 1 of 1
DATED         : November 6, 2001
INVENTOR(S)   : Hiroaki Miyajima et al.

It is certified that error appears in the above-identified patent and that said Letters Patent is hereby corrected as shown below:

<u>Title page,</u>
Item [30], Foreign Application Priority Data, change "10-09111" to -- 10-091111 --

Signed and Sealed this

Third Day of September, 2002

Attest:

Attesting Officer

JAMES E. ROGAN
*Director of the United States Patent and Trademark Office*